US008437306B2

(12) United States Patent
Attar et al.

(10) Patent No.: US 8,437,306 B2
(45) Date of Patent: May 7, 2013

(54) LAYER 2 TUNNELING OF DATA DURING HANDOVER IN A WIRELESS COMMUNICATION SYSTEM

(75) Inventors: Rashid Ahmed Akbar Attar, San Diego, CA (US); Arnaud Meylan, San Diego, CA (US); Sai Yiu Duncan Ho, San Diego, CA (US); Francesco Grilli, La Jolla, CA (US); Nathan Edward Tenny, Poway, CA (US); Peter Anthony Barany, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1111 days.

(21) Appl. No.: 12/187,539

(22) Filed: Aug. 7, 2008

(65) Prior Publication Data
US 2009/0124259 A1    May 14, 2009

Related U.S. Application Data

(60) Provisional application No. 60/954,779, filed on Aug. 8, 2007.

(51) Int. Cl.
*H04W 4/00* (2009.01)
(52) U.S. Cl.
USPC ............ 370/331; 370/349; 455/436; 455/437
(58) Field of Classification Search .................. 370/331, 370/328, 349; 455/436–444; 709/227–229, 709/238–239
See application file for complete search history.

(56) References Cited

U.S. PATENT DOCUMENTS

| 7,643,451 | B2 | 1/2010 | He et al. | |
|---|---|---|---|---|
| 2006/0083201 | A1* | 4/2006 | He et al. | 370/331 |
| 2008/0076432 | A1* | 3/2008 | Senarath et al. | 455/442 |
| 2008/0268852 | A1* | 10/2008 | Petrovic et al. | 455/442 |

FOREIGN PATENT DOCUMENTS

| EP | 1067811 A2 | 1/2001 |
|---|---|---|
| JP | 8186858 | 7/1996 |
| JP | 2007110352 | 4/2007 |
| JP | 2007129591 | 5/2007 |

OTHER PUBLICATIONS

International Search Report and the Written Opinion—PCT/US2008/072698, International Search Authority—European Patent Office—Apr. 17, 2009.

(Continued)

*Primary Examiner* — Marcos Torres
(74) *Attorney, Agent, or Firm* — Darrell Scott Juneau; John J. Ketchum

(57) ABSTRACT

Techniques for sending data during handover with Layer 2 tunneling are described. In one design, a user equipment (UE) sends first Layer 2 packets to a source base station prior to handover to a target base station. The UE sends at least one second Layer 2 packet to the target base station, which identifies the second Layer 2 packet(s) as being intended for the source base station and thus forwards the second Layer 2 packet(s) to the source base station via a Layer 2 tunnel. The UE sends third Layer 2 packets to the target base station after the handover. The target base station processes the third Layer 2 packets to obtain IP packets and sends the IP packets to a serving gateway after a trigger condition, which may be defined to achieve in-order delivery of IP packets from the source and target base stations to the serving gateway.

14 Claims, 17 Drawing Sheets

OTHER PUBLICATIONS

Mitts H et al: "Lossless Handover for Wireless ATM" M0BIC0M. Proceedings of the Annual International Conference 0NM0BILE Computing and Networking, XX, XX, Nov. 11, 1996, pp. 85-96, XP001048563* p. 88, left-hand column, paragraph "Example of the Handover Algorithm"—p. 92, left-hand column, paragraph "Uplink buffering during handover".

"3rd Generation Partnership Project; Technical Specification Group Radio Access Network; Evolved Universal Terrestrial Radio Access (E-UTRA); Packet Data Convergence Protocol (PDCP) specification" (Release 8), 3GPP TS 36.323 V8.3.0 (Sep. 2008).

"3rd Generation Partnership Project; Technical Specification Group Radio Access Network; Evolved Universal Terrestrial Radio Access (E-UTRA) Radio Link Control (RLC) protocol specification" (Release 8), 3GPP TS 36.322 V8.3.0 (Sep. 2008).

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2" (Release 8), 3GPP TS 36.300 V8.6.0 (Sep. 2008).

3GPP2: "3GPP2 C.S0084-004-0 Version 1.0 Apr. 2007 Application Layer for Ultra Mobile Broadband (UMB) Air Interface Specification" 3GPP2. [Online] Apr. 2007, pp. 1-3-10, XP002501324 Retrieved from the Internet: URL:http://www.3gpp2.org/Public_html/specs/alltsgscfm.cfm>.

Taiwan Search Report—TW097130462—TIPO—Apr. 19, 2012.

\* cited by examiner

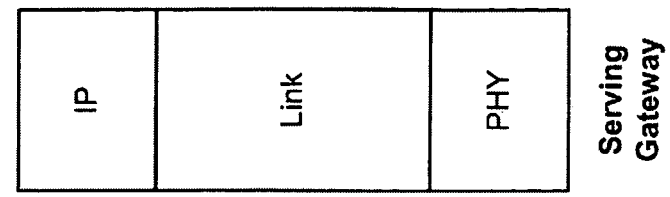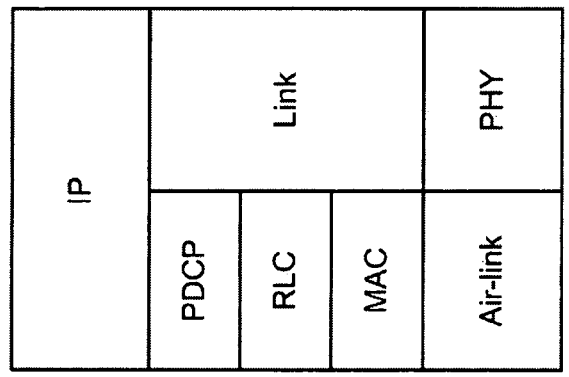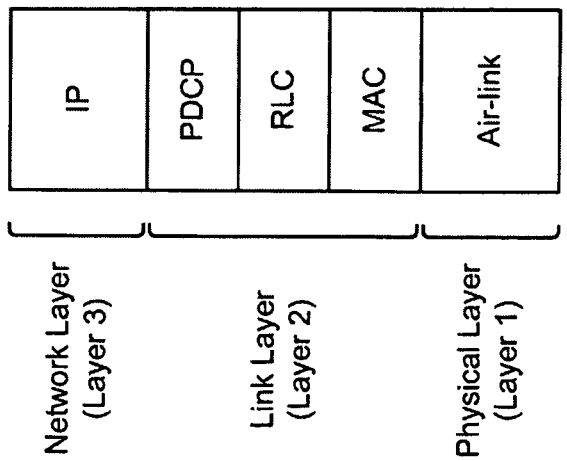
FIG. 2

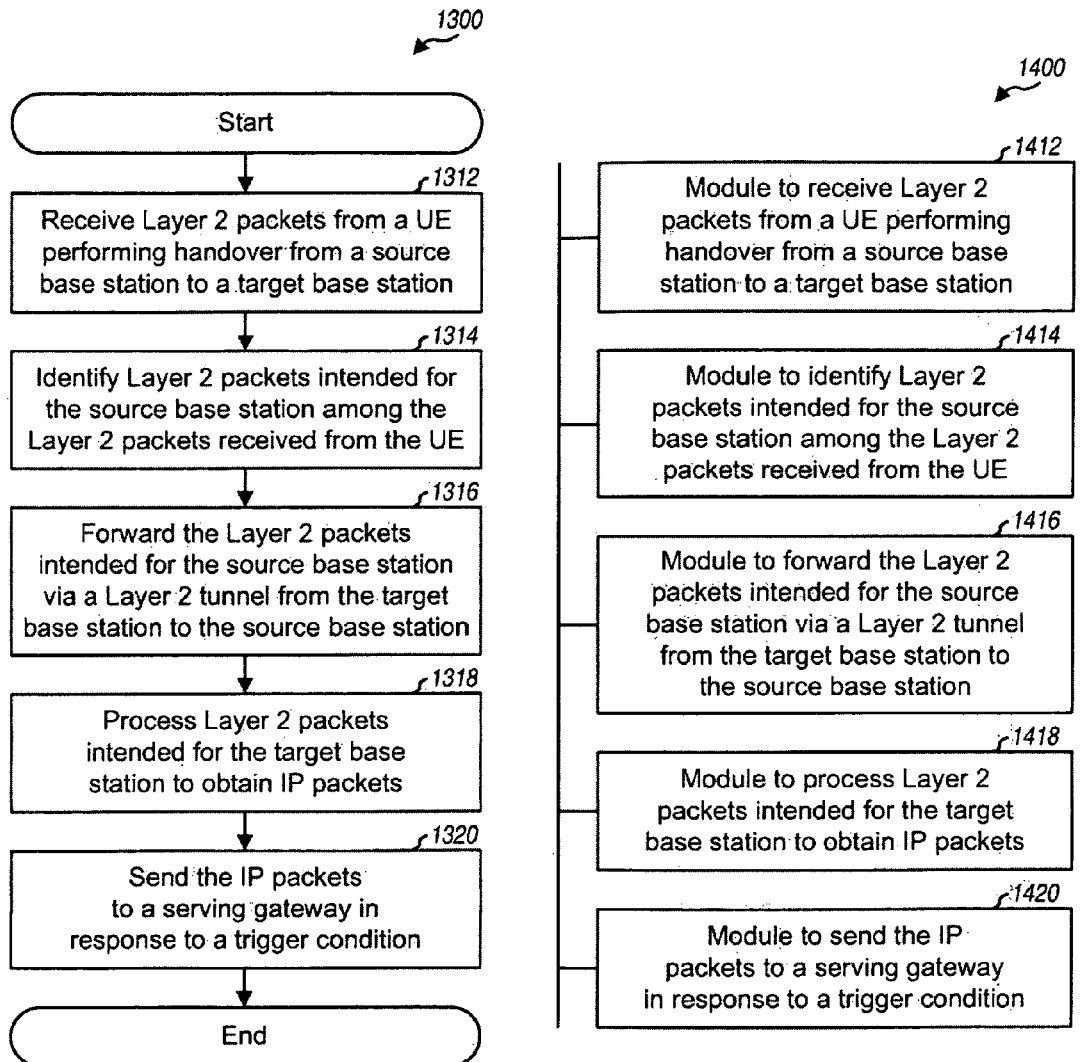

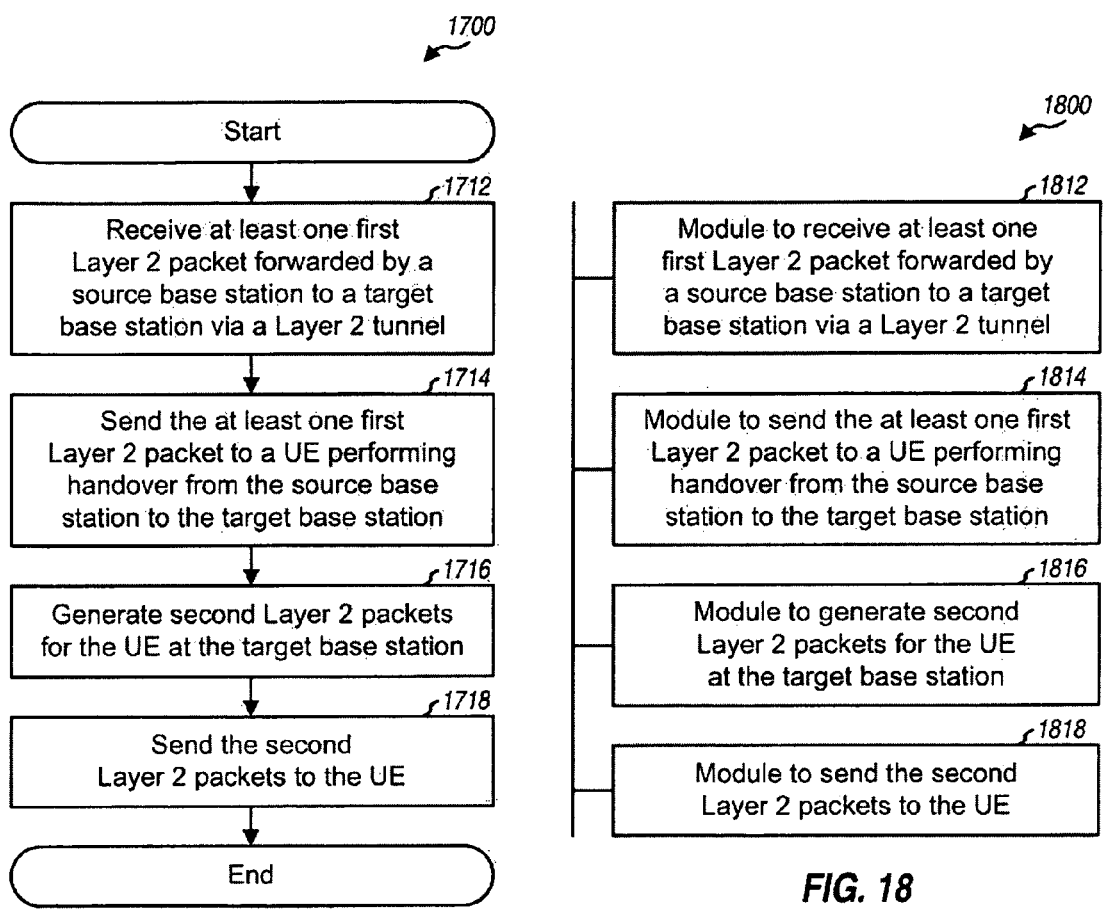

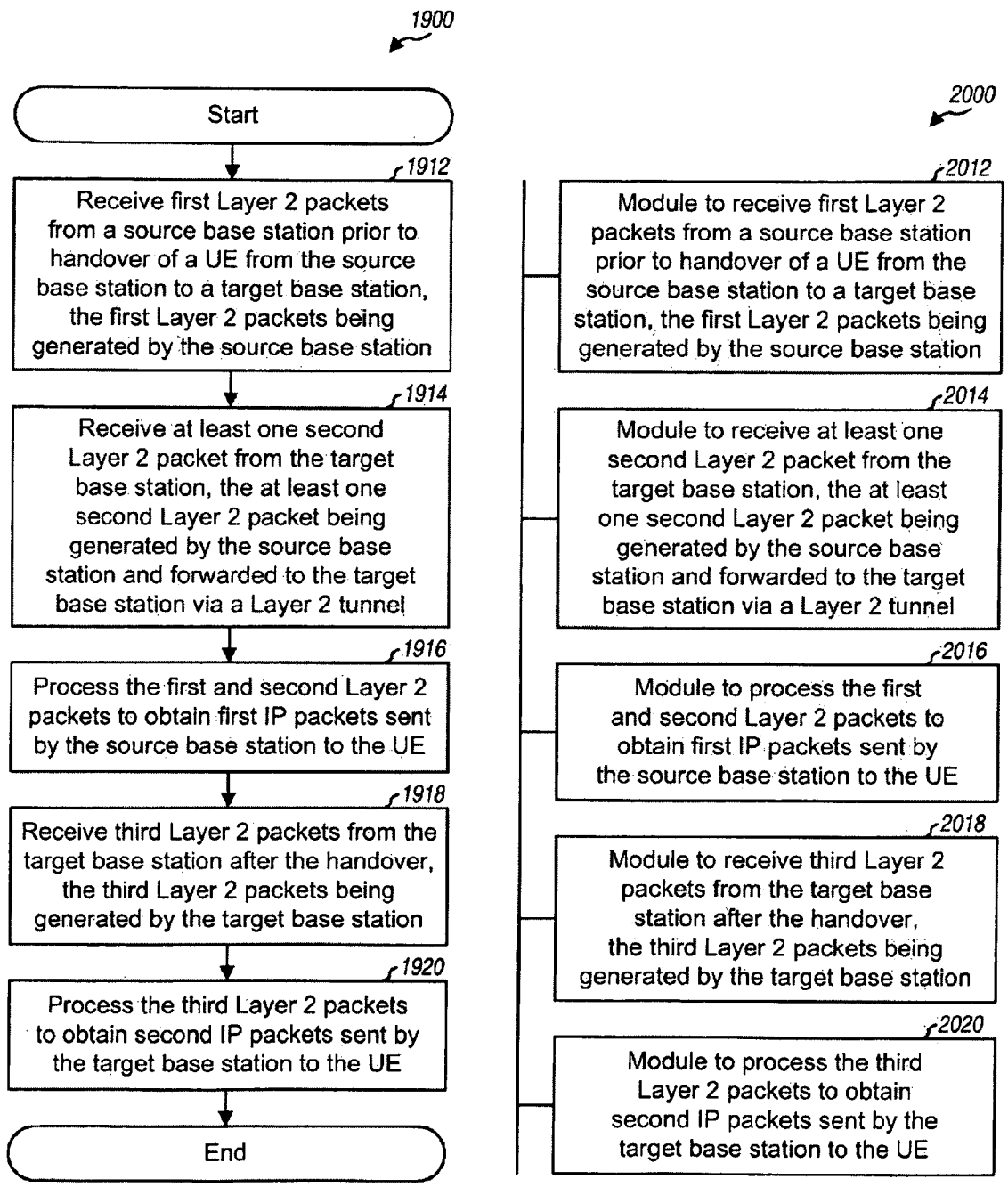

LAYER 2 TUNNELING OF DATA DURING HANDOVER IN A WIRELESS COMMUNICATION SYSTEM

The present application claims priority to provisional U.S. Application Ser. No. 60/954,779, entitled "METHOD AND APPARATUS FOR LAYER 2 TUNNELLING OPTIMIZATION FOR HANDOVER," filed Aug. 8, 2007, assigned to the assignee hereof and incorporated herein by reference.

BACKGROUND

I. Field

The present disclosure relates generally to communication, and more specifically to techniques for sending data in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A UE may be mobile and may be handed over from one base station to another base station when the UE moves about the system. During handover, the UE may have data to send to the base stations and/or the base stations may have data to send to the UE. It is desirable to efficiently send the data by/to the UE during handover in order to achieve good performance.

SUMMARY

Techniques for sending data on the downlink and uplink during handover with Layer 2 tunneling are described herein. A UE may perform handover from a source base station to a target base station. Layer 2 tunneling may be performed between the source and target base stations during handover in order to reduce retransmissions of data that has already been successfully transmitted by/to the UE. In one design of data transmission on the uplink during handover, the UE may process first Internet Protocol (IP) packets in accordance with a first Layer 2 configuration for the source base station to obtain first Layer 2 packets and at least one second Layer 2 packet intended for the source base station. The UE may set a destination indicator of each first Layer 2 packet and each second Layer 2 packet to a first value assigned to the source base station. The UE may send the first Layer 2 packets to the source base station prior to handover. The UE may send the at least one second Layer 2 packet to the target base station. The target base station may identify the second Layer 2 packet(s) as being intended for the source base station based on the destination indicator of each second Layer 2 packet. The target base station may forward the second Layer 2 packet(s) to the source base station via a Layer 2 tunnel. The UE may process second IP packets in accordance with a second Layer 2 configuration for the target base station to obtain third Layer 2 packets intended for the target base station. The UE may set a destination indicator of each third Layer 2 packet to a second value assigned to the target base station. The UE may send the third Layer 2 packets to the target base station after handover. The target base station may identify the third Layer 2 packet as being intended for it based on the destination indicator of each third Layer 2 packet. The target base station may process the third Layer 2 packets to obtain the second IP packets and may forward these IP packets to a serving gateway in response to a trigger condition. Various mechanisms may be used to generate the trigger condition to achieve in-order delivery of IP packets from the source and target base stations to the serving gateway.

Layer 2 tunneling may also be used for data transmission on the downlink, as described below. Various aspects and features of the disclosure are described in further detail below.

BRIEF DESCRIPTION OF THE DRAWINGS

FIG. 2 shows example protocol stacks for various entities in FIG. 1.

FIGS. 13 and 14 show a process and an apparatus, respectively, for receiving data on the uplink at a target base station.

FIGS. 17 and 18 show a process and an apparatus, respectively, for sending data on the downlink.

FIGS. 19 and 20 show a process and an apparatus, respectively, for receiving data on the downlink.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for LTE, and LTE terminology is used in much of the description below.

Figure 1:
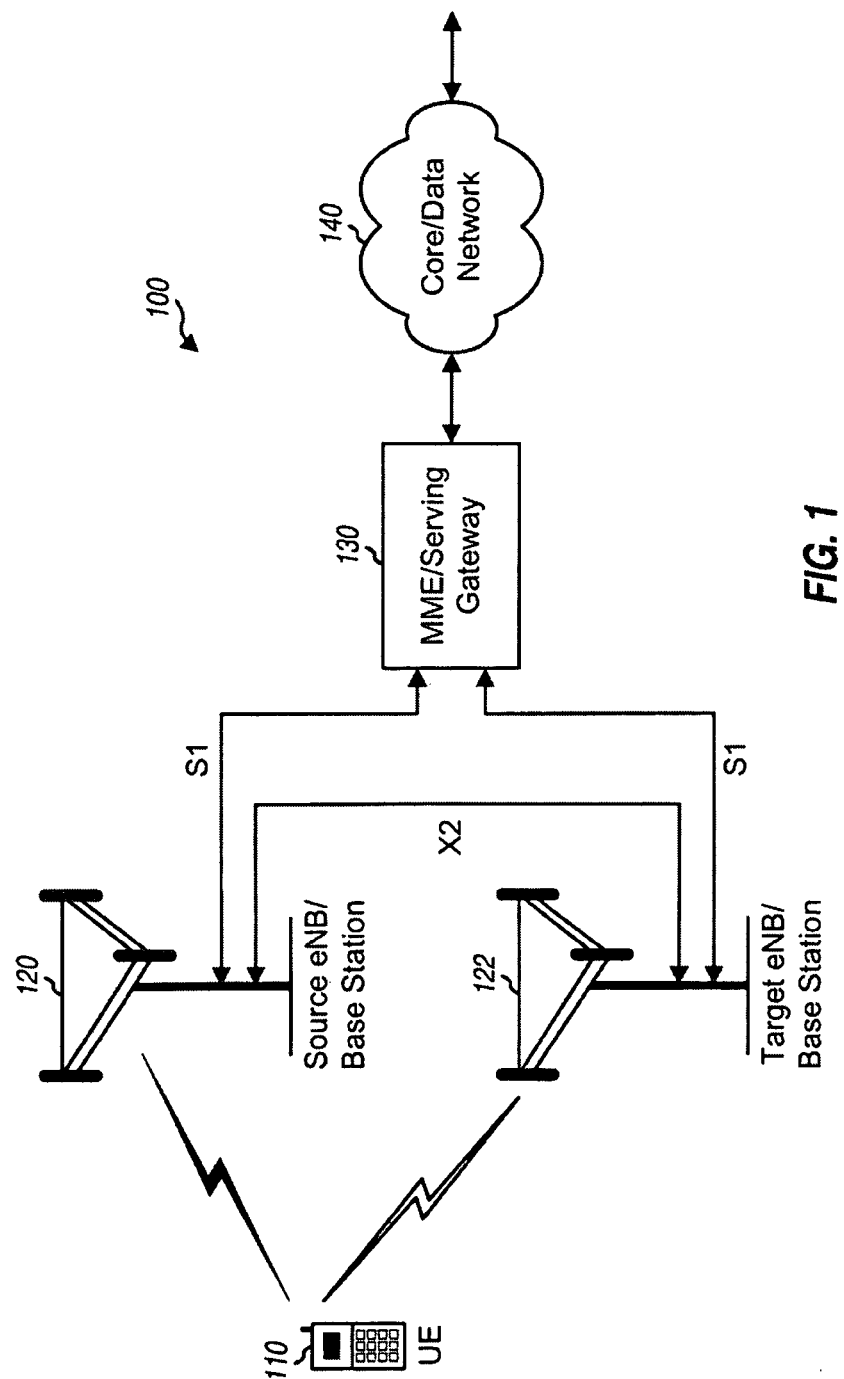
FIG. 1 shows a wireless communication system.

FIG. 1 shows a wireless communication system 100, which may be an LTE system. System 100 may include evolved Node Bs (eNBs) and other network entities described by 3GPP. For simplicity, only two eNBs 120 and 122 and one Mobility Management Entity (MME)/serving gateway 130 are shown in FIG. 1. An eNB may be a fixed station that communicates with the UEs and may also be referred to as a Node B, a base station, an access point, etc. eNBs 120 and 122 may communicate with each other via an X2 interface, which may be a logical or physical interface. eNBs 120 and 122 may communicate with MME/serving gateway 130 via an S1 interface. Serving gateway 130 may support data services such as packet data, Voice-over-IP (VoIP), video, messaging, etc. Serving gateway 130 may also be referred to as an access gateway, a packet data network (PDN) gateway, etc. MME 130 may be responsible for path switch between a source eNB and a target eNB at handover. MME/serving gateway 130 may couple to a core and/or data network 140 (e.g., the Internet) and may communicate with other entities (e.g., remote servers and terminals) that couple to core/data network 140. The functions of eNBs 120 and 122 and MME/serving gateway 130 are described in 3GPP TS 36.300, entitled "Evolved Universal Terrestrial Radio Access (E-UTRA) and Evolved Universal Terrestrial Radio Access Network (E-UTRAN); Overall description; Stage 2," which is publicly available.

A UE 110 may communicate with eNB 120 and/or eNB 122 via the downlink and uplink. The downlink (or forward link) refers to the communication link from an eNB to a UE, and the uplink (or reverse link) refers to the communication link from the UE to the eNB. UE 110 may be stationary or mobile and may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, etc. UE 110 may initially communicate with eNB 120 for data exchanges with MME/serving gateway 130. UE 110 may be mobile and may perform handover from eNB 120 to eNB 122. For the handover, eNB 120 may be referred to as a source eNB, and eNB 122 may be referred to as a target eNB. After the handover, UE 110 may communicate with eNB 122 for data exchanges with MME/serving gateway 130. eNB 120 may be a serving eNB for UE 110 prior to the handover, and eNB 122 may be the serving eNB for the UE after the handover.

FIG. 2 shows example protocol stacks 200 for a user plane in LTE. The user plane carries traffic data between UE 110 and MME/serving gateway 130 via a serving eNB, which may be eNB 120 or 122 in FIG. 1. Each entity maintains a protocol stack for communication with another entity. Each protocol stack typically includes a network layer (Layer 3 or L3), a link layer (Layer 2 or L2), and a physical layer (Layer 1 or L1 or PHY). The UE and the MME/serving gateway may exchange data using IP at the network layer. Higher layer data for Transmission Control Protocol (TCP), User Datagram Protocol (UDP), and/or other protocols may be encapsulated in IP packets, which may be exchanged between the UE and the MME/serving gateway via the serving eNB.

The link layer is typically dependent on wireless network technology. For the user plane in LTE, the link layer for the UE is composed of three sublayers for Packet Data Convergence Protocol (PDCP), Radio Link Control (RLC), and Medium Access Control (MAC), which are terminated at the serving eNB. The UE further communicates with the serving eNB via E-UTRA air-link interface at the physical layer. The serving eNB may communicate with the MME/serving gateway via IP and a technology-dependent interface for the link and physical layers.

PDCP may perform various functions such as compression of upper layer protocol headers (e.g., in accordance with a robust header compression (ROHC) protocol described in RFC 3095), ciphering/encryption and integrity protection of data for security, etc. RLC may perform various functions such as (i) segmentation and concatenation of RLC service data units (SDUs) and error correction through Automatic Repeat reQuest (ARQ) at a transmitter and (ii) duplicate detection of lower layer SDUs, re-ordering of RLC SDUs, and in-sequence delivery of upper layer protocol data units (PDUs) at a receiver. The functions performed by PDCP and RLC in LTE may be provided by equivalent protocols in other radio technologies. For example, an IP adaptation layer and a Radio Link Protocol (RLP) in cdma2000 may perform functions similar to those performed by PDCP and RLC, respectively.

The functions of PDCP and RLC are described in the aforementioned 3GPP TS 36.300. PDCP is also described in 3GPP TS 36.323, entitled "Evolved Universal Terrestrial Radio Access (E-UTRA); Packet Data Convergence Protocol (PDCP) Specification." RLC is also described in 3GPP TS 36.322, entitled "Evolved Universal Terrestrial Radio Access (E-UTRA); Radio Link Control (RLC) Protocol Specification." These documents are publicly available.

Figure 3:
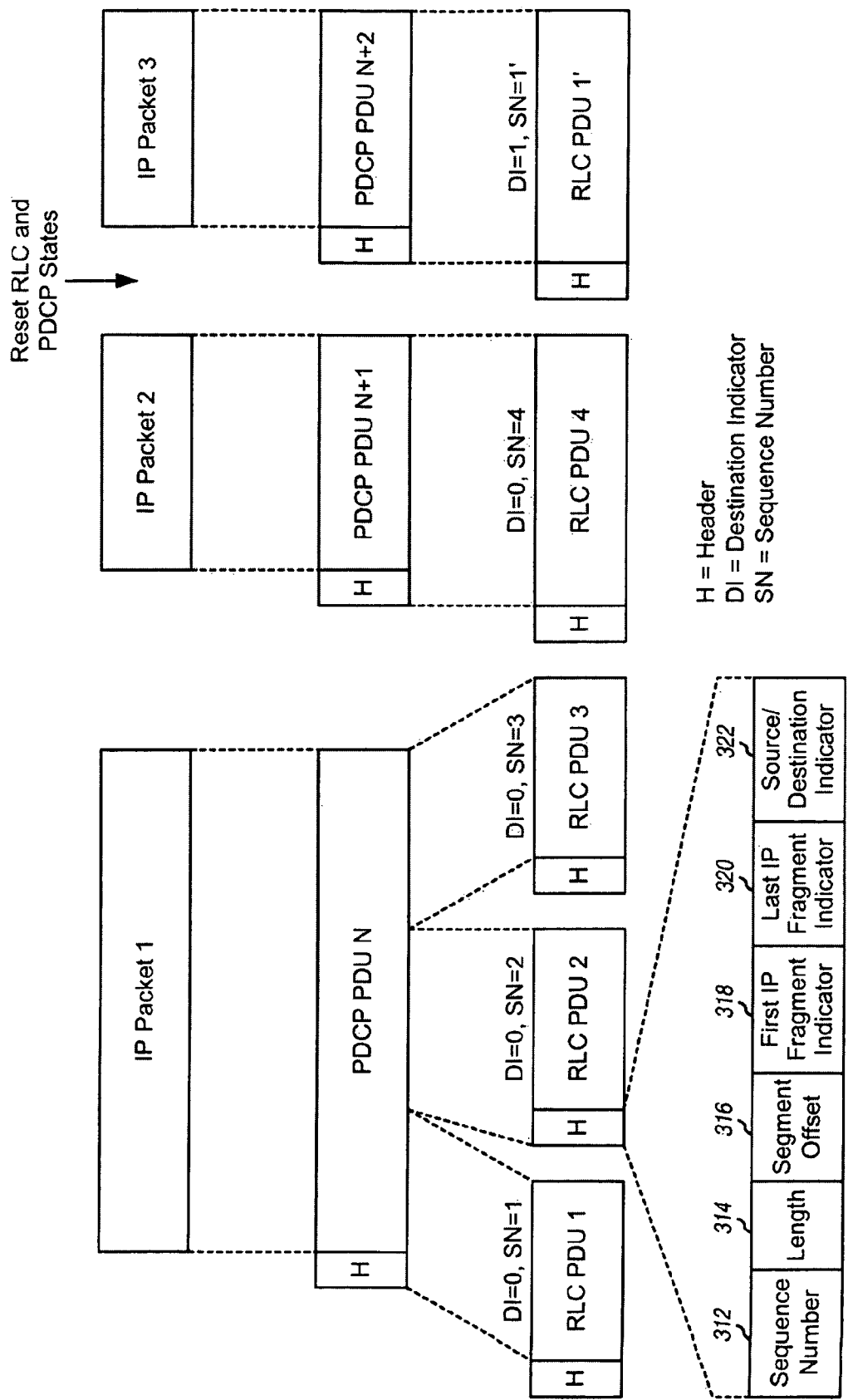
FIG. 3 shows example processing at a transmitter for Layer 2.

FIG. 3 shows example processing by PDCP and RLC at a transmitter, which may be UE 110 for uplink data transmission or eNB 120 or 122 for downlink data transmission. PDCP may receive IP packets, which may be referred to as PDCP SDUs. PDCP may perform header compression, ciphering, and integrity protection for each IP packet and provide a corresponding PDCP PDU. PDCP may also assign a sequentially increasing PDCP sequence number (SN) to each PDCP PDU.

RLC may receive the PDCP PDUs, which may be referred to as RLC SDUs. In general, a PDU from a given layer/sublayer may be referred to as an SDU at the next lower layer/sublayer. RLC may perform segmentation and/or concatenation of the RLC SDUs and provide RLC PDUs of appropriate sizes for MAC. RLC may assign a sequentially increasing RLC sequence number to each RLC PDU. RLC may also re-transmit RLC PDUs received in error by a receiver. MAC may process each RLC PDU and generate a corresponding MAC PDU, which may be further process by PHY and transmitted. In the description herein, the term "packet" generically refers to a unit of data. A PDU may also be referred to as a packet.

UE 110 may maintain a Layer 2 configuration, which may comprise RLC and PDCP states, for a serving Node B. The RLC state may include the RLC sequence number and other information. The PDCP state may include the PDCP sequence number, information used for ciphering (e.g., cryptographic keys, ciphering algorithm, sequence number, etc.), information used for header compression (e.g., IP address, port number, timestamp, etc.), and/or other information. The RLC state information and the PDCP state information may also be referred to as RLC context and PDCP context, respectively. For each link layer state at the UE, there may be corresponding link layer state at the serving eNB. The UE may reset RLC and PDCP states at each handover to a new serving eNB. The PDCP sequence number may be incremented continuously even during handover whereas the RLC sequence number may be reset for each new serving eNB.

In the example shown in FIG. 3, IP packet 1 is sent in one PDCP PDU with sequence number N, which is sent in three RLC PDUs with sequence numbers 1, 2 and 3. IP packet 2 is sent in one PDCP PDU N+1, which is sent in one RLC PDU 4. The RLC state is reset after IP packet 2 due to handover to a new serving eNB. The PDCP sequence number may continue after handover. However, a new set of cryptographic keys may be used by PDCP after handover, and the header compression protocol may be reset. The next IP packet 3 is sent in one PDCP PDU N+2, which is sent in one RLC PDU 1'. The prime in 1' denotes the RLC sequence numbering for the new serving eNB after resetting RLC.

FIG. 3 also shows a design of an RLC header for an RLC PDU. In this design, the RLC header includes a field 312 for the RLC sequence number, a field 314 for the length of the RLC PDU, a field 316 for a segment offset, a field 318 for a first IP fragment indicator, a field 320 for a last IP fragment indicator, and a field 322 for a destination/source indicator. An IP packet may be segmented into multiple fragments, and each IP fragment may be sent in one RLC PDU. The segment offset indicates the start of an IP fragment sent in an RLC PDU. The first IP fragment indicator indicates whether the RLC PDU carries the first IP fragment. The last IP fragment indicator indicates whether the RLC PDU carries the last IP fragment. For uplink data transmission, field 322 carries a destination indicator (DI) that indicates an intended recipient eNB of the RLC PDU sent by the UE. For downlink data transmission, field 322 carries a source indicator (SI) that indicates the eNB originating the RLC PDU sent to the UE and having the corresponding link layer context for the UE. The RLC header may also include fewer, different and/or additional fields not shown in FIG. 3.

As shown in FIG. 1, UE 110 may perform handover from source eNB 120 to target eNB 122. For efficient operation, data handling during handover may be designed to achieve the following:

Avoid over-the-air transmission of duplicate IP packets as a result of handover, e.g., by enabling selective RLC packet forwarding during handover;

Allow in-order delivery of packets to PDCP and IP;

Avoid impact to PDCP (ROHC and ciphering), e.g., by directing all fragments of each PDCP packet to the same eNB and by avoiding PDCP context transfer from the source eNB to the target eNB; and Handle rapid changes in serving eNB due to ping-pong effect.

The techniques described herein may be used for uplink data transmission as well as downlink data transmission during handover. Furthermore, the techniques may be used for communication between the UE and two or more eNBs. For clarity, much of the description below is for uplink data transmission from the UE to two eNBs.

In an aspect, Layer 2 tunneling for RLC packets may be performed between the source eNB and the target eNB during handover in order to reduce retransmissions of fragments of IP packets that have already been successfully transmitted to the source eNB. Layer 2 tunneling may also be referred to as RLC tunneling, L2 tunneling, L2 RLC tunneling, etc. As shown in FIG. 3, an IP packet may be processed (e.g., for RoHC and ciphering) based on PDCP context for the source eNB to generate multiple RLC packets. Each RLC packet may carry a fragment of the IP packet. The UE may send one or more of these RLC packets to the source eNB prior to handover. The UE may have one or more pending RLC packets after handover to the target eNB. The pending RLC packets may include RLC packets not yet sent to the source eNB as well as RLC packets sent to the source eNB but not successfully received by the source eNB.

In one design, the UE may send the pending RLC packets to the target eNB after handover. The target eNB may then forward these RLC packets to the source eNB via a Layer 2 tunnel. The source eNB may process the RLC packets received directly from the UE and the tunneled RLC packets received from the target eNB to re-assemble corresponding RLC SDUs. The source eNB may then send the IP packet to the MME/serving gateway. By forwarding the pending RLC packets via the Layer 2 tunnel to the source eNB, the IP packet do not need to be re-processed by the UE based on PDCP context for the target eNB. Furthermore, the RLC packets successfully sent to the source eNB do not need to be resent to the target eNB, which may save radio resources.

An RLC header for an RLC packet may include a destination indicator that indicates the intended recipient eNB of the RLC packet, as shown in FIG. 3. In one design, the destination indicator may be a 1-bit value that may be toggled whenever there is a change in the serving eNB for the UE. In another design, the destination indicator may be a multi-bit value that can indicate one of two or more eNBs. In any case, the source eNB may be assigned a specific value of the destination indicator, and the target eNB may be assigned a different value of the destination indicator. The target eNB may identify all RLC packets with destination indicator values different than the value assigned to the target eNB. The target eNB may forward these RLC packets to the source eNB via the Layer 2 tunnel. In another design, an eNB ID may be used to enable an "active set" where several eNBs may keep link layer context for the UE. The destination eNB that has the appropriate link layer context may be identified in the RLC header, and the destination indicator may be larger than 1 bit in this case. In any case, all fragments of each IP packet may be sent to the same eNB for re-assembly of that IP packet.

Figure 4:
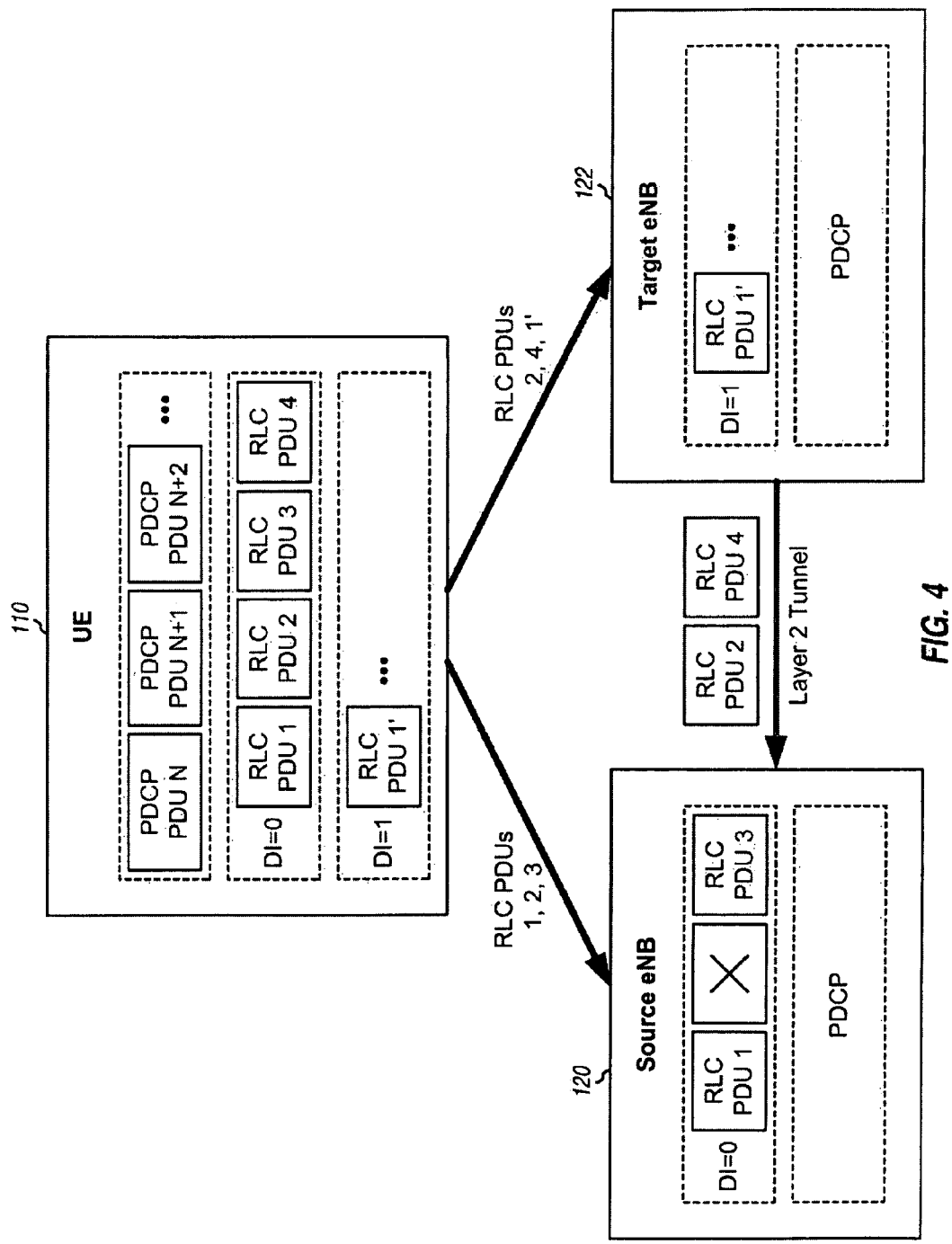
FIG. 4 shows an example of Layer 2 tunneling during handover.

FIG. 4 shows an example of Layer 2 tunneling during handover. In this example, the UE may process IP packet 1 to generate RLC PDUs 1, 2 and 3 intended for the source eNB, process IP packet 2 to generate RLC PDU 4 intended for the source eNB, and process IP packet 3 to generate RLC PDU 1' intended for the target eNB, as shown in FIG. 3. RLC packets 1, 2, 3 and 4 may have their destination indicators set to '0' for the source eNB, and RLC packet 1' may have its destination indicator set to '1' for the target eNB.

The UE may send RLC packets 1, 2 and 3 to the source eNB. The source eNB may receive RLC packets 1 and 3 correctly but may receive RLC packet 2 in error. The UE may switch to the target eNB and may resend RLC packet 2 to the target eNB. The target eNB may recognize that RLC packet 2 is intended for the source eNB and may forward this RLC packet to the source eNB via a Layer 2 tunnel. The UE may send RLC packet 4 to the target eNB, which may also forward this RLC packet to the source eNB via the Layer 2 tunnel. The UE may thereafter send RLC packet 1' to the target eNB, which may recognize that this RLC packet is intended for the target eNB and may thus retain the RLC packet.

In another aspect, in-order delivery of IP packets may be supported during handover. The UE may send IP packets to the source eNB prior to and during handover and may send IP packets to the target eNB during and after handover. The target eNB may not know when the last IP packet has been sent to the source eNB. Various mechanisms may be used to allow the target eNB to determine when the last IP packet was sent to the source eNB, so that the target eNB can start sending its received IP packets to the MME/serving gateway.

In one design, the UE may send an RLC Flush message via the target eNB to the source eNB when the UE has sent all RLC packets intended for the source eNB. The RLC Flush message may indicate that no more RLC packets will be sent by the UE for the link layer context. The source eNB may stop waiting for further retransmissions from the UE and may deliver all re-assembled RLC SDUs, possibly with gaps in sequence number, to PDCP. PDCP may process the PDCP PDUs and then send the corresponding IP packets to the MME/serving gateway. The source eNB may send an RLC Handover (HO) Complete message to the target eNB when the source eNB (i) has received the RLC Flush message from the UE or (ii) does not expect to receive any more RLC packets from the UE. Condition (ii) may be true if the source eNB does not have any RLC holes or RLC has timed out waiting for the UE to fill the RLC holes. The target eNB may start sending IP packets to the MME/serving gateway upon receiving the RLC Handover Complete message from the source eNB.

In another design, the target eNB may start (or reset) a wait timer whenever it receives an RLC packet intended for the source eNB. The wait timer may be set to a value equal to the nominal latency for the X2 interface between the source eNB and the target eNB plus the worst-case H-ARQ latency. The target eNB may assume that it will not receive any more RLC packets intended for the source eNB after the wait timer expires. The target eNB may start sending IP packets to the MME/serving gateway when the wait timer expires. The use of the wait timer may ensure that IP packets sent to the target eNB will be forwarded to the MME/serving gateway after all IP packets sent to the source eNB have been forwarded to the MME/serving gateway.

In yet another design, the target eNB may start the wait timer after receiving a message from the UE confirming that it has completed handover. The target eNB may start sending IP packets to the MME/serving gateway when the wait timer expires.

Figure 5:
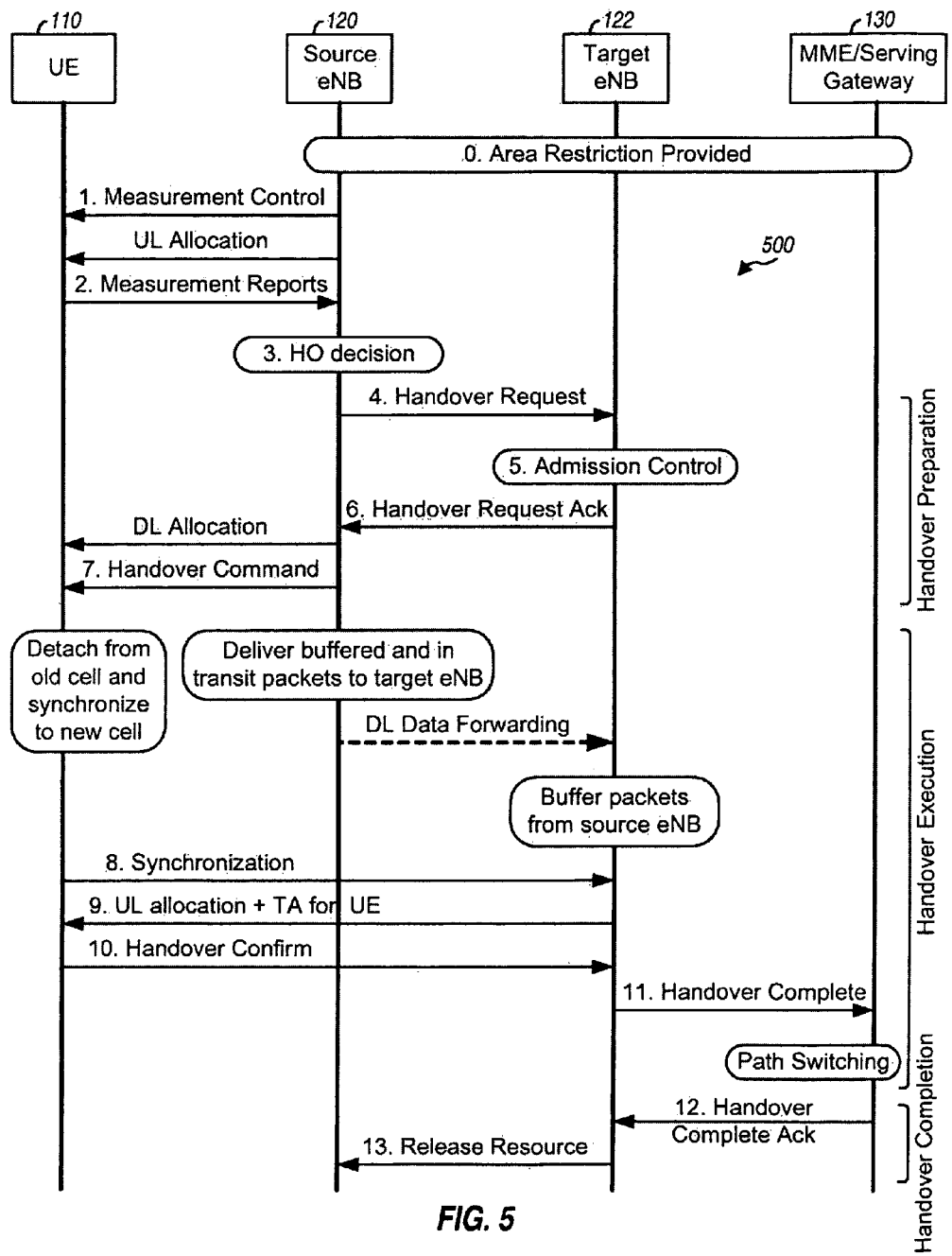
FIG. 5 shows an example call flow for handover.

FIG. 5 shows an example call flow 500 for handover of UE 110 from source eNB 120 to target eNB 122. The source eNB may configure measurement procedures for the UE (step 1), and the UE may send measurement reports to the source eNB (step 2). The source eNB may make a decision to handover (HO) the UE (step 3) and may issue a Handover Request message to the target eNB (step 4). The target eNB may perform admission control and may accept handover of the UE (step 5). The target eNB may return a Handover Request Acknowledgement (Ack) message to the source eNB (step 6). The source eNB may then send a Handover Command message to the UE (step 7). The source eNB may deliver buffered and in-transmit packets for the UE to the target eNB, which may buffer these packets.

Upon receiving the Handover Command message in step 7, the UE may detach from the source eNB. The UE may perform synchronization to the target eNB and may start acquiring uplink timing advance (step 8). The target eNB may respond with resource allocation and timing advance (TA) for the UE (step 9). Once the UE has successfully accessed the target eNB, the UE may send a Handover Confirm message to the target eNB to indicate that the handover procedure is completed for the UE (step 10).

The target eNB may send a Handover Complete message to inform the MME/serving gateway that the UE has changed eNB (step 11). The MME/serving gateway may then switch a data path or connection for the UE from the source eNB to the target eNB. The MME/serving gateway may also return a Handover Complete Ack message to the target eNB (step 12). The target eNB may send a Release Resource message to the source eNB to indicate successful handover of the UE (step 13). The source eNB may release resources for the UE upon receiving the Release Resource message.

Figure 6:
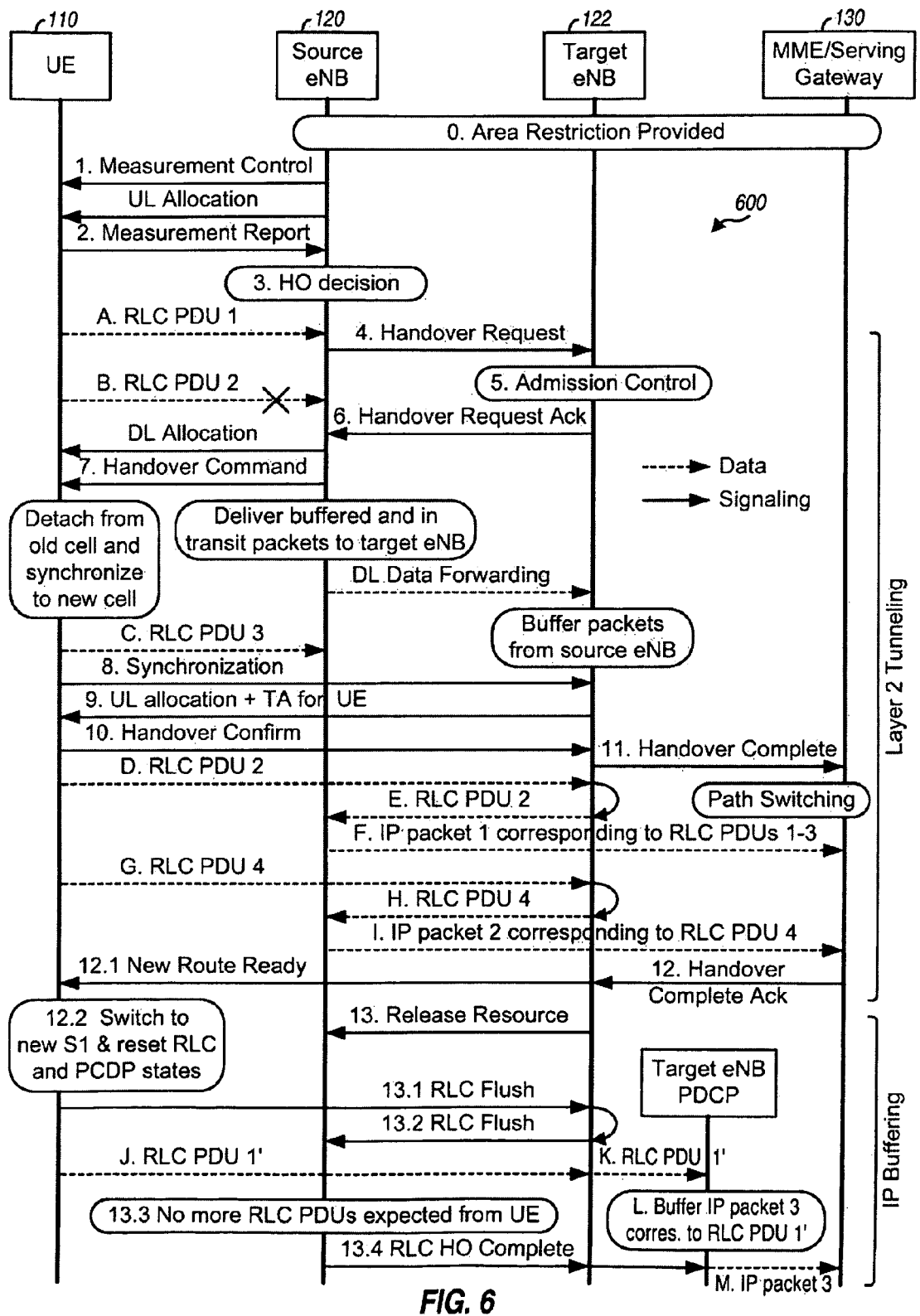
FIGS. 6 through 10 show call flows for various designs of handover with Layer 2 tunneling and IP buffering and/or IP tunneling.

FIG. 6 shows a design of a call flow 600 for handover of UE 110 from source eNB 120 to target eNB 122 with Layer 2 tunneling for RLC packets and in-order IP packet delivery through use of an RLC Flush message and a New Route Ready message. Steps 1 through 13 in FIG. 6 may correspond to steps 1 through 13, respectively, in FIG. 5. FIG. 6 further includes various steps for data handling during handover.

In the example shown in FIG. 6, the UE may generate three RLC PDUs 1, 2 and 3 for IP packet 1. The UE may intend to send these RLC PDUs to the source eNB and may set the destination indicator of each RLC PDU to a value of x assigned to the source eNB, where x may be equal to '0' or '1' for a 1-bit destination indicator. The UE may send RLC PDUs 1 and 2 to the source eNB prior to the switch to the target eNB (steps A and B). The source eNB may correctly receive RLC PDU 1 but may receive RLC PDU 2 in error. The UE may send RLC PDU 3 to the source eNB prior to performing synchronization to the target eNB (step C). After sending the Handover Confirm message to the target eNB in step 10, the UE may resend RLC PDU 2 to the target eNB (step D). The target eNB may recognize that RLC PDU 2 is intended for the source eNB based on the destination indicator value of x and may forward this RLC PDU to the source eNB via a Layer 2 tunnel (step E). The source eNB may obtain all three RLC PDUs 1, 2 and 3 for IP packet 1 and may send the re-assembled IP packet to the MME/serving gateway (step F).

In the design shown in FIG. 6, the UE may continue to use the S1 connection via the source eNB as well as the RLC and PDCP states for the source eNB until a switch in S1 connection is made to the target eNB. The UE may generate one RLC PDU 4 for the next IP packet 2 and may set the destination indicator of this RLC PDU to a value of x for the source eNB. The UE may send RLC PDU 4 to the target eNB (step G), which may forward the RLC PDU to the source eNB via the Layer 2 tunnel (step H). The source eNB may send IP packet 2 corresponding to RLC PDU 4 to the MME/serving gateway (step I).

In the design shown in FIG. 6, to support in-order IP packet delivery, the target eNB may send a New Route Ready message to the UE after receiving the Handover Complete Ack message from the MME/serving gateway (step 12.1). The UE may switch to the new S1 connection via the target eNB and may reset RLC and PDCP states upon receiving the New Route Ready message or later depending on the status of retransmissions to the source eNB (step 12.2). At the time of RLC and PDCP reset, the UE may send an RLC Flush message to the target eNB (step 13.1), which may forward the message to the source eNB (step 13.2). Reception of the RLC Flush message from the UE via the target eNB may indicate to the source eNB that no more RLC PDUs are expected from the UE (step 13.3). The source eNB may then send an RLC HO Complete message to the target eNB (step 13.4).

The UE may use the new S1 connection and the new RLC and PDCP states after the switch in S1 connection in step 12.2. The UE may generate one RLC PDU 1' for the next IP packet 3 and may set the destination indicator of this RLC PDU to a value of y assigned to the target eNB. The UE may send RLC PDU 1' to the target eNB (step J), which may pass the RLC PDU up to PDCP at the target eNB (step K). The target eNB may buffer IP packet 3 corresponding to RLC PDU 1' in PDCP (step L). After receiving the RLC HO Complete message from the source eNB in step 13.5, the target eNB may assume that all prior IP packets have been sent by the source eNB to the MME/serving gateway and may then send IP packet 3 to the MME/serving gateway (step M).

In the design shown in FIG. 6, Layer 2 tunneling may be used for all RLC PDUs received by the target eNB but intended for the source eNB. Layer 2 tunneling may thus be used in steps E and H to forward RLC PDUs 2 and 4 from the target eNB to the source eNB, which may be expecting these RLC PDUs. Layer 2 tunneling may avoid retransmission of RLC PDUs for IP packets 1 and 2, which are intended for the source eNB.

In the design shown in FIG. 6, in-order IP packet delivery may be supported with the New Route Ready message and the RLC HO Complete message. The target eNB may delay sending IP packets to the MME/serving gateway until after receiving the RLC HO Complete message from the source eNB.

Figure 7A:
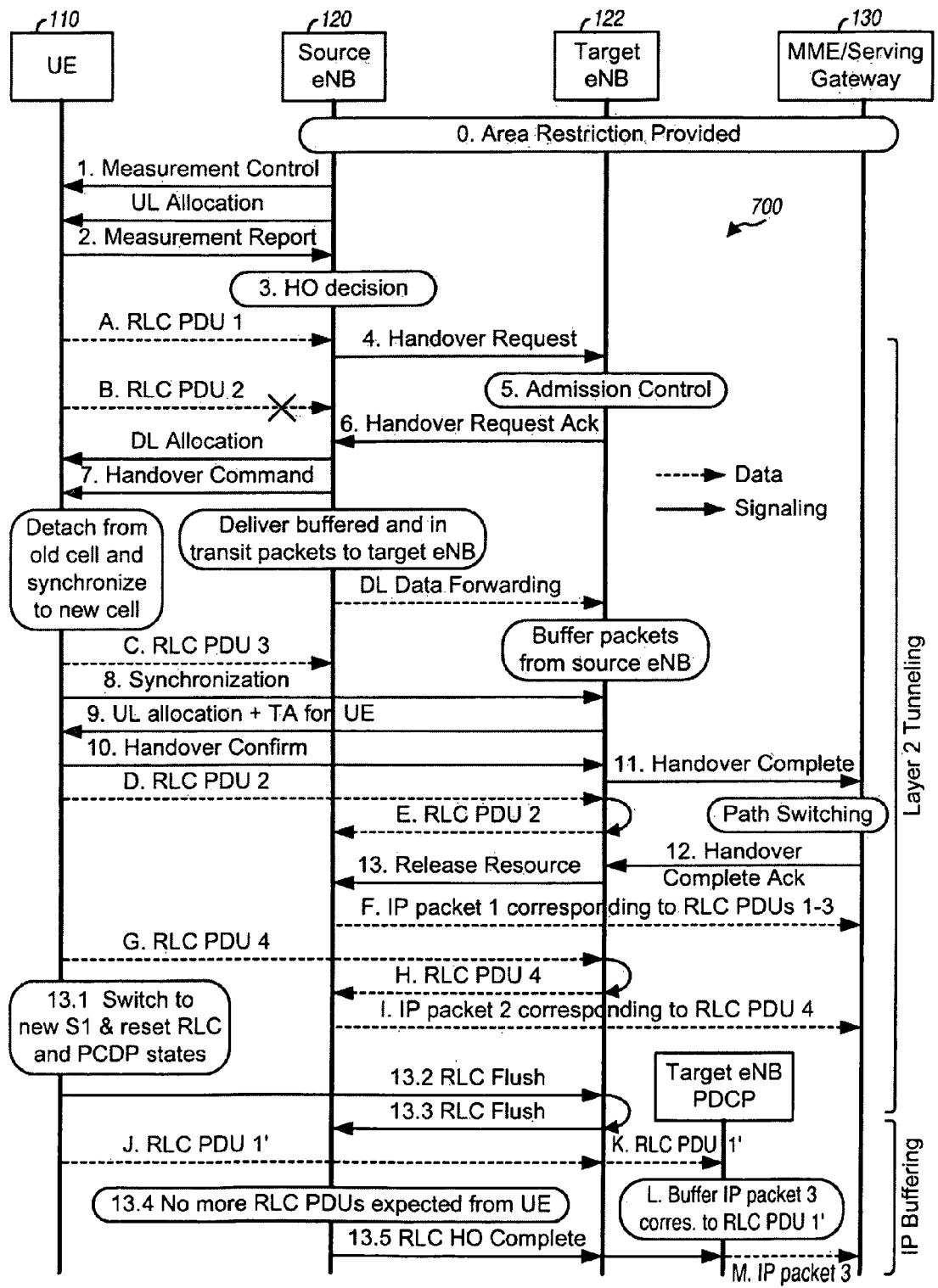

FIG. 7A shows a design of a call flow 700 for handover of UE 110 from source eNB 120 to target eNB 122 with Layer 2 tunneling and in-order IP packet delivery through use of an RLC Flush message. Call flow 700 shows a case in which the S1 setup delay is shorter than the X2 delay, so that a new S1 connection via the target eNB is available prior to receiving an RLC HO Complete message from the source eNB. Steps 1 through 13 in FIG. 7A may correspond to steps 1 through 13, respectively, in FIG. 5. FIG. 7A further includes various steps for data handling during handover.

In the design shown in FIG. 7A, the UE may switch to the new S1 connection and may reset RLC and PDCP states when (i) the new S1 connection is ready, e.g., as indicated by a New Route Ready message not shown in FIG. 7A, and (ii) the UE has sent all pending RLC packets to the source eNB via L2 tunnel (step 13.1). The UE may then send an RLC Flush message to the target eNB (step 13.2), which may forward the message to the source eNB (step 13.3). After receiving the RLC Flush message, the source eNB may determine that no more RLC PDUs are expected from the UE (step 13.4) and may then send an RLC HO Complete message to the target eNB (step 13.5).

Steps A through M in FIG. 7A may correspond to steps A through M, respectively, in FIG. 6. Layer 2 tunneling may be used for all RLC PDUs received by the target eNB but intended for the source eNB. IP buffering may be used for all IP packets received by the target eNB from the UE prior to the RLC HO Complete message from the source eNB.

Figure 7B:
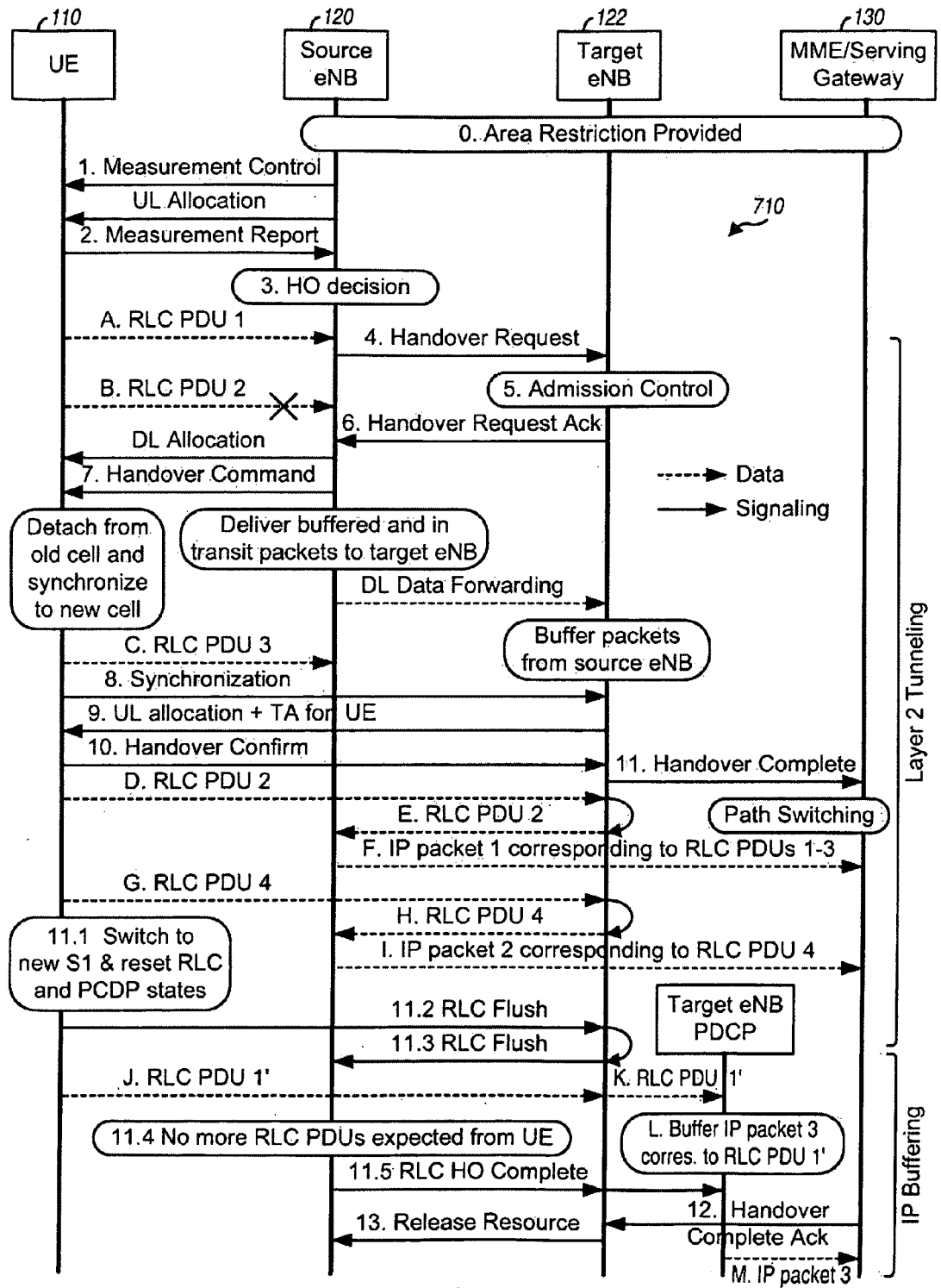

FIG. 7B shows a design of a call flow 710 for handover of UE 110 from source eNB 120 to target eNB 122 with Layer 2 tunneling and in-order IP packet delivery through use of an RLC Flush message. Call flow 710 shows a case in which the S1 setup delay is longer than the X2 delay, so that a new S1 connection via the target eNB is available after receiving an RLC HO Complete message from the source eNB. Steps 1 through 13 in FIG. 7B may correspond to steps 1 through 13, respectively, in FIG. 5. FIG. 7B further includes various steps for data handling during handover.

In the design shown in FIG. 7B, the UE may switch to the new S1 connection and may reset RLC and PDCP states after sending the last IP packet intended for the source eNB (step 11.1). The UE may then send an RLC Flush message to the target eNB (step 11.2), which may forward the message to the source eNB (step 11.3). The source eNB may receive the RLC Flush message, determine that no more RLC PDUs are expected from the UE (step 11.4), and send an RLC HO Complete message to the target eNB (step 11.5). The target eNB may receive the Handover Complete Ack message from the MME/serving gateway (step 12), which may occur after receiving the RLC HO Complete message from the source eNB.

Steps A through M in FIG. 7B may correspond to steps A through M, respectively, in FIG. 6. Layer 2 tunneling may be used for all RLC PDUs received by the target eNB but intended for the source eNB. IP buffering may be used for all IP packets received by the target eNB from the UE prior to completion of S1 setup. The target eNB may send the buffered IP packets to the MME/serving gateway after receiving the Handover Complete Ack message from the MME/serving gateway.

Figure 8:
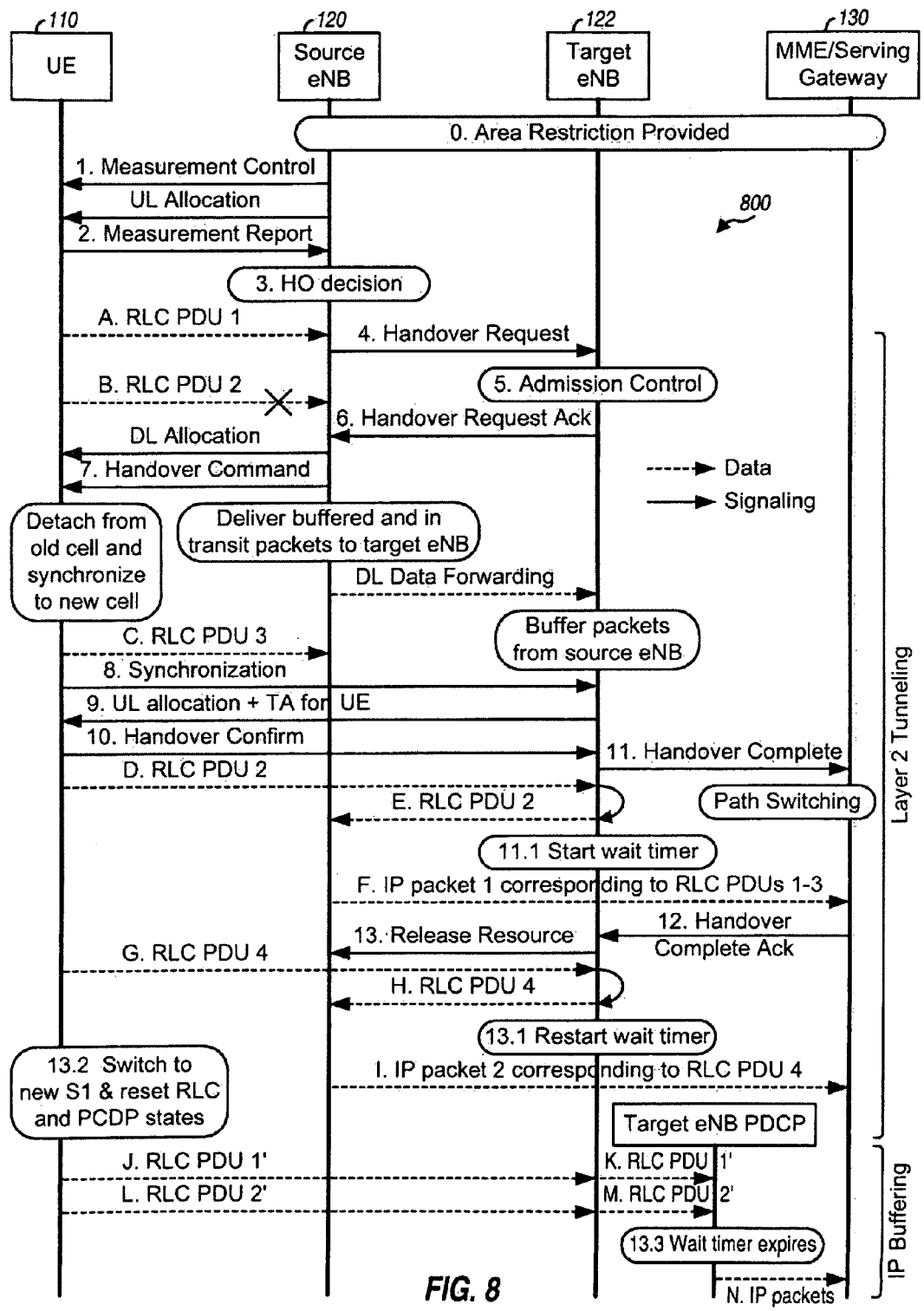

FIG. 8 shows a design of a call flow 800 for handover of UE 110 from source eNB 120 to target eNB 122 with Layer 2 tunneling and in-order IP packet delivery through use of a wait timer at the target eNB. Steps 1 through 13 in FIG. 8 may correspond to steps 1 through 13, respectively, in FIG. 5. Steps A through I in FIG. 8 may correspond to steps A through I, respectively, in FIG. 6.

In the design shown in FIG. 8, the target eNB may receive RLC PDU 2 intended for the source eNB (step D), start the wait timer upon receiving this RLC PDU (step 11.1), and forward the RLC PDU to the source eNB via a Layer 2 tunnel (step E). The target eNB may thereafter receive RLC PDU 4 also intended for the source eNB (step G), restart the wait timer upon receiving this RLC PDU (step 13.1), and forward the RLC PDU to the source eNB via the Layer 2 tunnel (step H). The target eNB may continue to restart the wait timer whenever it receives an RLC PDU intended for the source eNB from the UE.

The UE may prioritize packets destined to the source eNB and may switch to the new S1 connection and reset RLC and PDCP states after sending the last IP packet intended for the source eNB (step 13.2). The UE may thereafter generate and send RLC PDU 1' to the target eNB (step J), which may pass this RLC PDU up to PDCP (step K). The UE may similarly generate and send RLC PDU 2' to the target eNB (step L), which may also pass this RLC PDU up to PDCP (step M). The target eNB may buffer IP packets received from the UE until the wait timer expires. When the wait timer expires (step 13.3), the target eNB may send IP packets corresponding to RLC PDUs 1' and 2' to the MME/serving gateway (step N). The target eNB may send subsequent IP packets directly to the MME/serving gateway, without buffering these IP packets, since the wait timer has already expired.

Figure 9:
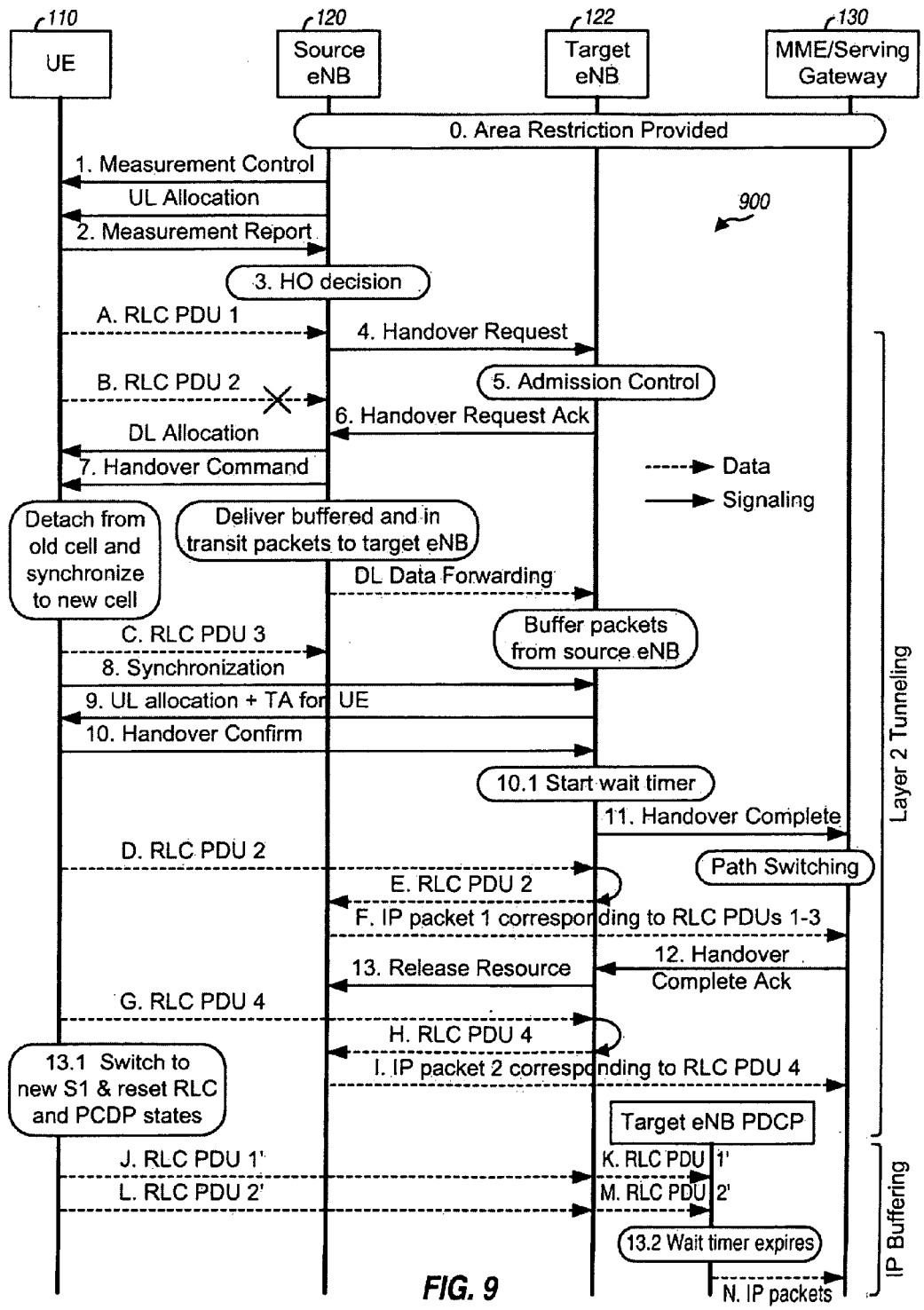

FIG. 9 shows a design of a call flow 900 for handover of UE 110 from source eNB 120 to target eNB 122 with Layer 2 tunneling and in-order IP packet delivery through use of a wait timer. Steps 1 through 13 in FIG. 9 may correspond to steps 1 through 13, respectively, in FIG. 5. Steps A through F in FIG. 9 may correspond to steps A through F, respectively, in FIG. 6.

In the design shown in FIG. 9, the target eNB may start the wait timer upon receiving a Handover Confirm message from the UE (as shown in FIG. 9, step 10.1) or upon sending a Handover Complete message to the MME/serving gateway (not shown in FIG. 9). The target eNB may thereafter buffer IP packets received from the UE and intended for the target eNB until the wait timer expires. The UE may switch to the new S1 connection and may reset RLC and PDCP states after sending the last IP packet intended for the source eNB (step 13.1). The UE may thereafter generate and send RLC PDUs 1' and 2' to the target eNB (steps J and L), which may pass these RLC PDUs up to PDCP (steps K and M). The target eNB may buffer RLC PDUs 1' and 2'. When the wait timer expires (step 13.2), the target eNB may send IP packets corresponding to RLC PDUs 1' and 2' to the MME/serving gateway (step N).

In the designs shown in FIGS. 8 and 9, RLC tunneling may be used for all RLC PDUs received by the target eNB but intended for the source eNB. IP buffering may be used for all IP packets received by the target eNB from the UE prior to expiration of the wait timer. Normal data forwarding may occur after expiration of the wait timer.

Figure 10:
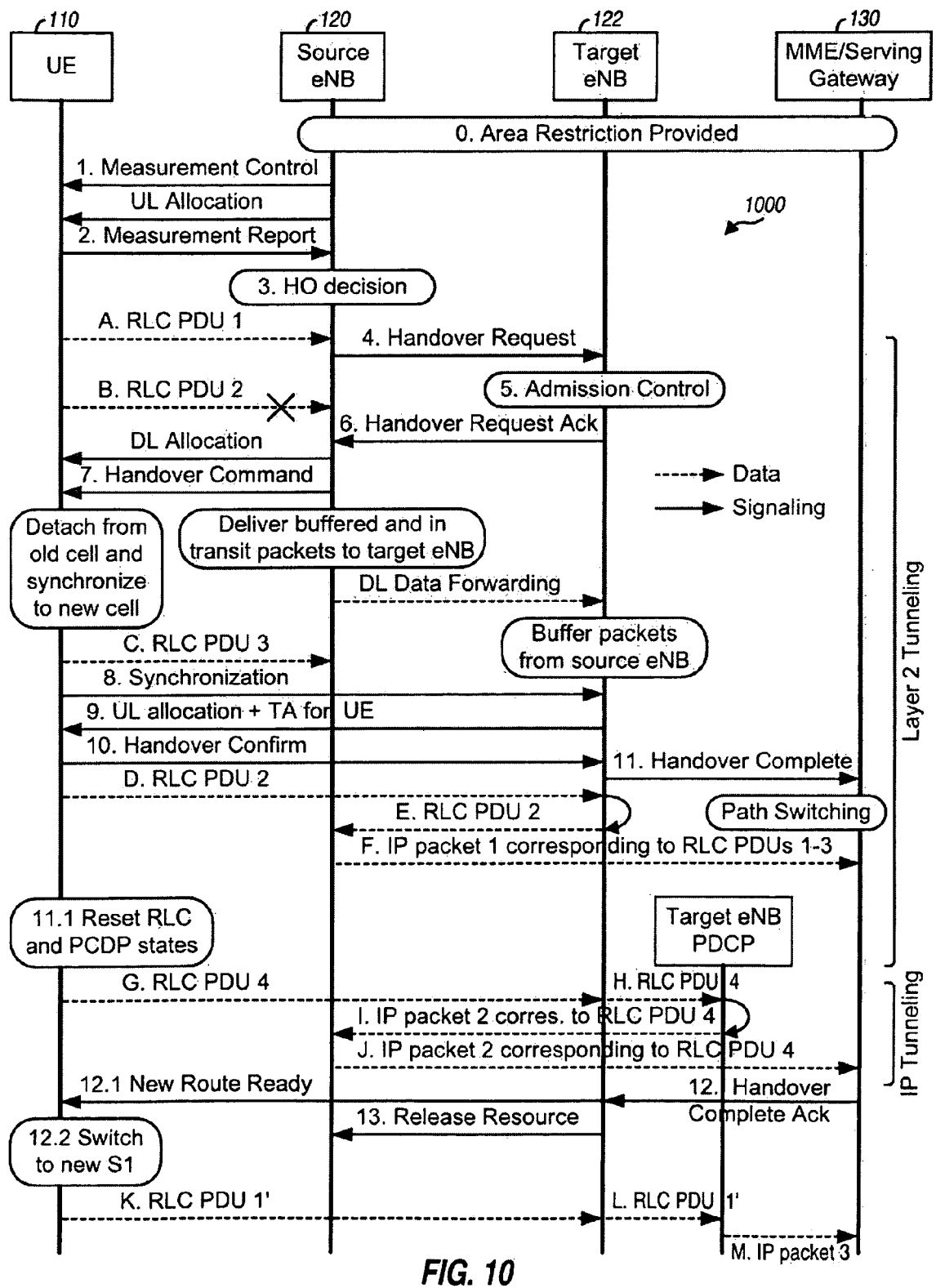

FIG. 10 shows a design of a call flow 1000 for handover of UE 110 from source eNB 120 to target eNB 122 with Layer 2 tunneling and IP tunneling. Steps 1 through 13 in FIG. 10 may correspond to steps 1 through 13, respectively, in FIG. 5. Steps A through F in FIG. 10 may correspond to steps A through F, respectively, in FIG. 6.

In the design shown in FIG. 10, the UE may reset RLC and PDCP states after sending the last IP packet intended for the source eNB (step 11.1). The UE may thereafter generate RLC PDU 4 for IP packet 2 based on the RLC and PDCP states for the target eNB. The UE may send RLC PDU 4 to the target eNB (step G), which may pass up the RLC PDU to PDCP (step H). The target eNB may forward IP packet 2 via an IP tunnel to the source eNB (step 1), which may send the IP packet to the MME/serving gateway (step J).

The target eNB may send a New Route Complete message to the UE (step 12.1) after receiving a Handover Complete Ack message from the MME/serving gateway (step 12). The UE may switch to the new S1 connection upon receiving the New Route Complete message (step 12.2). The UE may thereafter generate and send RLC PDU 1' for IP packet 3 to the target eNB (step K), which may pass the RLC PDU up to PDCP (step L). The target eNB may process RLC PDU 1' to obtain IP packet 3 and may send the IP packet to the MME/serving gateway (step M).

In the design shown in FIG. 10, Layer 2 tunneling may be used for all RLC PDUs received by the target eNB but intended for the source eNB. IP tunneling may be used for all IP packets received by the target eNB from the UE prior to the switch to the new S1 connection, which may be activated by the New Route Ready message. Normal data forwarding may occur after the switch to the new S1 connection.

FIGS. 6 through 10 show some example call flows with Layer 2 tunneling and various mechanisms for in-order IP packet delivery during handover. Layer 2 tunneling and in-order IP packet delivery may also be supported during handover with other call flows, which may use other mechanisms to achieve the functions described above.

The UE may maintain states for RLC and PDCP for the serving eNB. The UE may reset the RLC and PDCP states at handover from the source eNB to the target eNB. In one design, the UE may reset the RLC and PDCP states upon sending all RLC packets for IP packets intended for the source eNB. In another design, the UE may start a timer upon sending all RLC packets for IP packets intended for the source eNB and may reset the RLC and PDCP states when this timer expires. In yet another design, the UE may reset the RLC and PDCP states upon receiving a Target eNB Setup Complete message from the target eNB. For all designs, the UE may use the old RLC and PDCP states for RLC packets for IP packets intended for the source eNB and may use the new RLC and PDCP states for RLC packets for IP packets intended for the target eNB.

A new S1 connection between the target eNB and the MME/serving gateway may be set up for the UE during handover. In one design, the S1 setup may occur before the air-interface between the target eNB and the UE is set up. In another design, the S1 setup may occur after the air-interface between the target eNB and the UE is set up. For both designs, if in-order IP packet delivery is desired, then the target eNB may buffer IP packets received by the target eNB from the UE until the S1 setup is complete, as shown in FIG. 7B.

Data for the UE may be tunneled between the source eNB and the target eNB during handover in order to avoid or reduce retransmission of packets over the air. In one design, Layer 2 tunneling may be used to forward RLC packets between the source and target eNBs. In another design, Layer 2 tunneling plus IP tunneling may be used to forward RLC packets and/or IP packets between the source and target eNBs, e.g., as shown in FIG. 10. IP tunneling may be used to forward IP packets to the source eNB (e.g., prior to completion of S1 setup) in order to avoid buffering of IP packets at the target eNB.

In one design, rapid changes in serving eNB may be handled by detecting for duplicate RLC packets from the UE. An eNB may detect duplicate RLC packets from the UE if these RLC packets have the same Cell Radio Network Temporary Identifier (C-RNTI), the same destination indicator, and the same RLC sequence number. Upon detecting duplicate RLC packets from the UE, the eNB may flush its RLC state and pass all received RLC packets up to PDCP.

RLC supports an acknowledged mode (AM) and an unacknowledged mode (UM). In the RLC AM mode, the source eNB may send acknowledgements (ACKs) and negative acknowledgements (NAKs) for RLC packets either directly to the UE or via the target eNB over the X2 interface. In the RLC UM mode, the source eNB does not send ACKs or NAKs for RLC packets.

In one design, handover for the uplink may be supported as follows. The new S1 connection via the target eNB for the UE may be setup before setup of the air-interface between the target eNB and the UE. The RLC and PDCP states may be reset at the UE upon sending all RLC PDUs for IP packets intended for the source eNB. L2 tunneling may be used to forward RLC PDUs intended for the source eNB from the target eNB to the source eNB. For in-order IP packet delivery, the UE may send an RLC Flush message to the source eNB via the target eNB when the UE has sent all RLC packets intended for the source eNB, e.g., as shown in FIGS. 6, 7A and 7B. The target eNB may send an RLC HO Start message to the source eNB to initiate a UE context fetch from the source eNB in case of forward handover (for UE-initiated mobility). The source eNB may send an RLC HO Complete message to the target eNB after receiving the RLC Flush message from the UE and no more RLC PDUs are expected from the UE. In-order IP packet delivery may be used for certain types of data and skipped for other types of data (e.g., VoIP).

A rapid change in serving eNB on the uplink may occur when RLC at the source eNB is waiting for an RLC hole to be filled and receives a new RLC stream with different C-RNTI, destination indicator, and/or RLC sequence number. This scenario may be unlikely for applications that use RoHC (e.g., VoIP, gaming, video telephony, etc.) since the packet sizes are typically small and an inter-handover interval within an RLC timeout (which may be 150 to 200 ms) can be controlled via handover algorithm design. When this scenario occurs and RLC packets with a new C-RNTI for the UE are received at the eNB, existing RLC packets at the eNB may be passed up to PDCP.

In one design, handover for the downlink may be supported as follows. The target eNB may start sending a new RLC/PDCP stream to the UE for IP packets received from the MME/serving gateway. The UE may maintain two link layer states comprising RLC/PDCP streams and two buffers during handover—one RLC/PDCP stream and buffer for packets from the source eNB and another RLC/PDCP stream and buffer for packets from the target eNB. The UE may reset RLC state after switching to the target eNB. The target eNB may also maintain two RLC queues to serve the UE—one queue for packets forwarded from the source eNB via Layer 2 tunneling and another queue for packets received from the MME/serving gateway. The forwarded packets from the source eNB may have higher priority than the packets from the MME/serving gateway.

In one design, an RLC header may include a source indicator, as shown in FIG. 3. The source indicator may be a 1-bit (or more) value that may be toggled whenever there is a change in serving eNB for the UE. At handover, the source eNB may be assigned a specific value of the source indicator, and the target eNB may be assigned a different value of the source indicator. The source eNB may forward pending RLC packets for IP packets to the target eNB. The pending RLC packets may include RLC packets not yet sent by the source eNB to the UE as well as RLC packets sent by the source eNB but not acknowledged by the UE. The source indicator of each pending RLC packet may be set to the value assigned to the source eNB. The target eNB may send the pending RLC packets to the UE. For the RLC AM mode, the UE may send NAKs for the pending RLC PDUs to the target eNB, which may forward these NAKs to the source eNB via an X2 interface. For the RLC UM mode, no NAKs are sent by the UE.

Packet forwarding may be performed for the downlink using Layer 2 tunneling and/or IP tunneling. In a first design, the source eNB may forward all packets received from the MME/serving gateway for the UE to the target eNB via Layer 2 tunneling. The source indicator of each tunneled RLC packet may be set to the value assigned to the source eNB. IP tunneling may be omitted in this design. In a second design, the source eNB may forward pending RLC packets to the target eNB via Layer 2 tunneling and may forward pending IP packets to the target eNB via IP tunneling. The pending RLC packets may be for IP packets that the source eNB has started sending to the UE. The pending IP packets may include those that the source eNB has not started sending to the UE. The target eNB may not know when all IP packets have been received from the source eNB. The target eNB may maintain a wait timer to determine when it can start sending IP packets received from the MME/serving gateway to the UE. Packet forwarding may also be performed in other manners.

In-order IP packet delivery may be supported for the downlink in various manners. In a first design, the MME/serving gateway may indicate to the source eNB the last IP packet sent to the source eNB. The source eNB may send an End RLC packet corresponding to the last IP packet. The End RLC packet may be a special RLC packet that may be forwarded via the target eNB to the UE. The UE may flush its RLC buffer for the source eNB and may pass all received RLC packets up to PDCP after receiving the End RLC packet and if the UE does not expect to receive any more RLC packets from the source eNB. The UE may not expect any more RLC packets from the source eNB if there are no RLC holes for the source eNB or RLC has timed out waiting for the RLC holes to be filled. In a second design, the target eNB may send a Handover Complete message to the UE and may start a timer upon sending this message. The target eNB may restart the timer whenever it (i) sends a tunneled RLC packet (with the source indicator set to the source eNB) to the UE or (ii) receives a tunneled IP packet from the source eNB. The target eNB may start sending IP packets received from the MME/serving gateway to the UE upon expiration of the timer. In a third design, selective IP packet forwarding may be performed. The MME/serving gateway may assign GTP-U sequence numbers to IP packets. The source eNB may forward IP packets that it has not processed to the target eNB via an IP tunnel. To achieve in-order IP packet delivery, the target eNB may delay sending IP packets received from the MME/serving gateway until all tunneled IP packets from source eNB have been sent to the UE.

Figure 11:
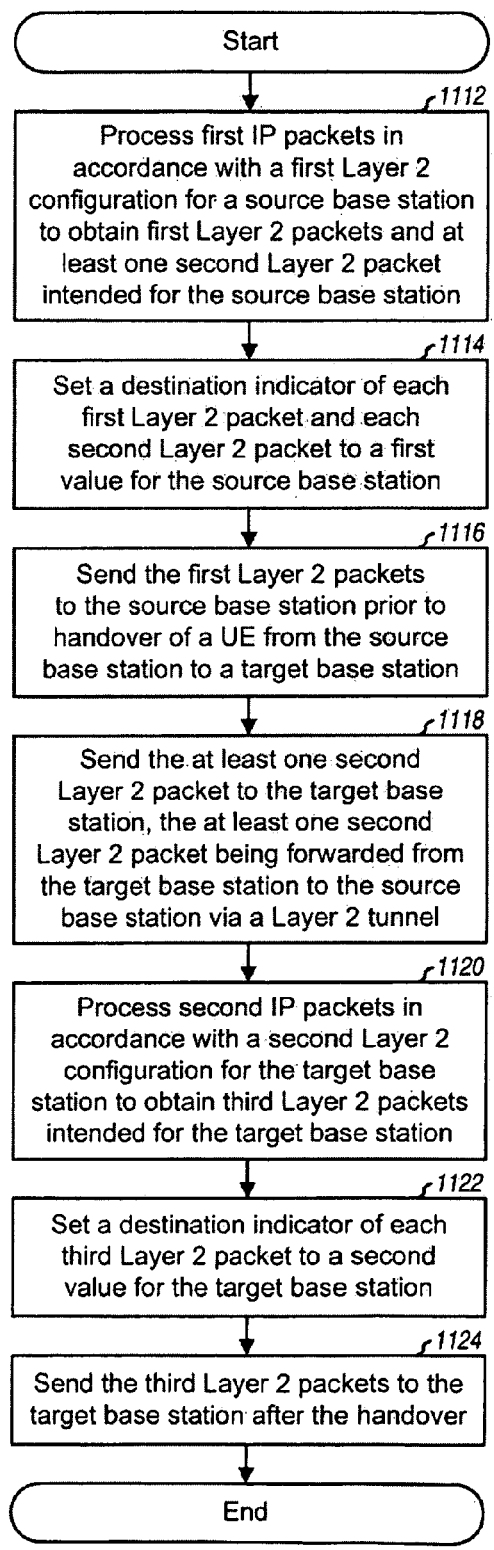
FIGS. 11 and 12 show a process and an apparatus, respectively, for sending data on the uplink.

FIG. 11 shows a design of a process 1100 for sending data on the uplink in a wireless communication system. Process 1100 may be performed by a UE (as described below) or by some other entity. The UE may process first IP packets in accordance with a first Layer 2 configuration for a source base station/eNB to obtain first Layer 2 packets and at least one second Layer 2 packet intended for the source base station (block 1112). The Layer 2 packets may comprise RLC PDUs or packets for some other protocol in Layer 2. The Layer 2 configuration may comprise settings for RLC, PDCP and/or other protocol in Layer 2. The UE may set a destination indicator of each first Layer 2 packet and each second Layer 2 packet to a first value for the source base station (block 1114). The UE may send the first Layer 2 packets to the source base station prior to handover of the UE from the source base station to a target base station/eNB (block 1116). The UE may send the at least one second Layer 2 packet to the target base station, with the at least one second Layer 2 packet being forwarded from the target base station to the source base station via a Layer 2 tunnel (block 1118).

The UE may process second IP packets in accordance with a second Layer 2 configuration for the target base station to obtain third Layer 2 packets intended for the target base station (block 1120). The UE may set a destination indicator of each third Layer 2 packet to a second value for the target base station (block 1122). The UE may send the third Layer 2 packets to the target base station after the handover (block 1124).

In one design, the UE may receive from the target base station a message indicating a new connection between the target base station and a serving gateway is set up, e.g., as shown in FIGS. 6 and 10. The UE may use the first Layer 2 configuration prior to receiving the message. The UE may use the first or second Layer 2 configuration after receiving the message. The UE may prioritize the transmission of Layer 2 packets associated with the first layer 2 configuration when the first and second layer 2 configurations are available. The UE may also switch to the new connection in response to receiving the message. In another design, the UE may switch from the first Layer 2 configuration to the second Layer 2 configuration after sending the last IP packet intended for the source base station. In one design, the UE may send a flush message to indicate that no more Layer 2 packets are intended for the source base station, e.g., as shown in FIGS. 6, 7A and 7B. The flush message may be received by the target base station and forwarded to the source base station.

In one design, the UE may store more than two link layer contexts for more than two eNBs in an active set. The UE may select the best eNB within the active set and may indicate the selected eNB as the destination eNB for each RLC packet sent to the selected eNB. There may be more than one source eNB. In this case, the target eNB can forward each RLP packet received from the UE to one of several source eNBs based on the destination indicator of that RLP packet.

Figure 12:
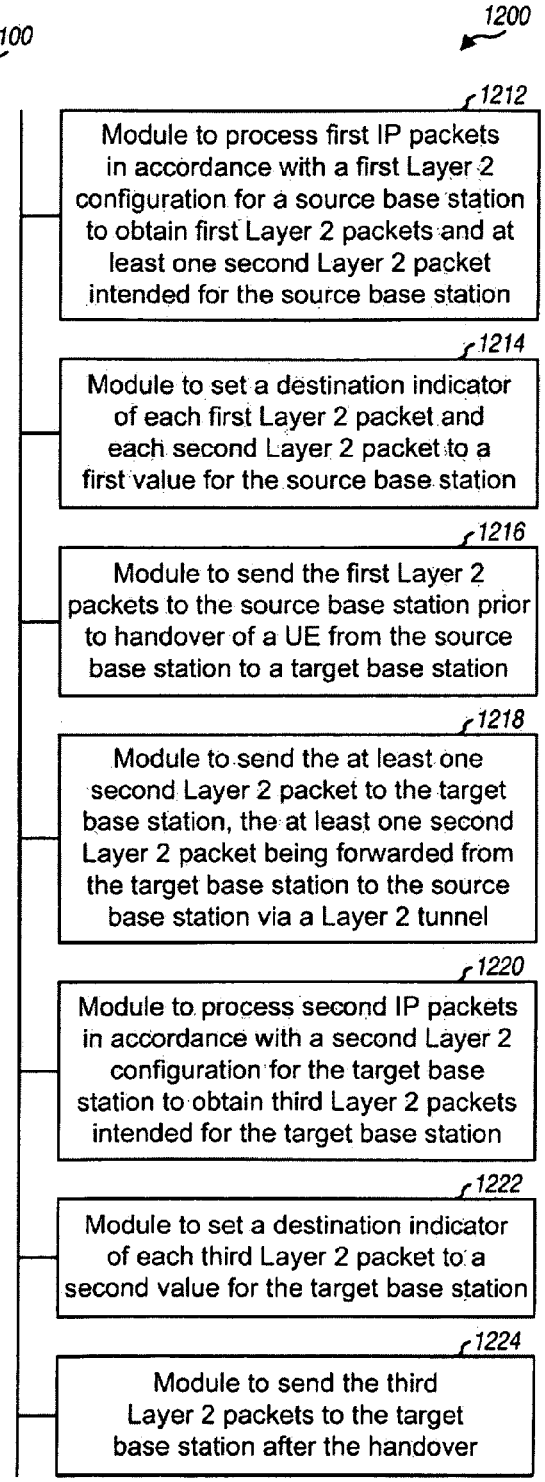

FIG. 12 shows a design of an apparatus 1200 for sending data on the uplink in a wireless communication system. Apparatus 1200 includes a module 1212 to process first IP packets in accordance with a first Layer 2 configuration for a source base station to obtain first Layer 2 packets and at least one second Layer 2 packet intended for the source base station, a module 1214 to set a destination indicator of each first Layer 2 packet and each second Layer 2 packet to a first value for the source base station, a module 1216 to send the first Layer 2 packets to the source base station prior to handover of a UE from the source base station to a target base station, a module 1218 to send the at least one second Layer 2 packet to the target base station, with the at least one second Layer 2 packet being forwarded from the target base station to the source base station via a Layer 2 tunnel, a module 1220 to process second IP packets in accordance with a second Layer 2 configuration for the target base station to obtain third Layer 2 packets intended for the target base station, a module 1222 to set a destination indicator of each third Layer 2 packet to a second value for the target base station, and a module 1224 to send the third Layer 2 packets to the target base station after the handover.

FIG. 13 shows a design of a process 1300 for receiving data on the uplink in a wireless communication system. Process 1300 may be performed by a target base station/eNB (as described below) or by some other entity. The target base station may receive Layer 2 packets from a UE performing handover from a source base station to the target base station (block 1312). The target base station may identify Layer 2 packets intended for the source base station among the Layer 2 packets received from the UE (block 1314). In one design, the target base station may determine whether each Layer 2 packet received from the UE is intended for the source base station based on a destination indicator of that Layer 2 packet, which may be set to a first value for the source base station or a second value for the target base station. The target base station may forward the Layer 2 packets intended for the source base station via a Layer 2 tunnel to the source base station (block 1316). The forwarded Layer 2 packets may include (i) Layer 2 packets for IP fragments sent by the UE and received in error by the source base station and (ii) Layer 2 packets for IP fragments not yet sent to the source base station by the UE.

The target base station may receive a flush message from the UE to flush Layer 2 packets at the source base station, e.g., as shown in FIGS. 6, 7A and 7B. The target base station may forward the flush message to the source base station.

The target base station may process Layer 2 packets intended for the target base station to obtain IP packets (block 1318). The target base station may send the IP packets to a serving gateway in response to a trigger condition (block 1320). In one design of block 1320, the target base station may receive a handover complete message from the source base station (e.g., as shown in FIGS. 6, 7A and 7B) and may send the IP packets to the serving gateway after receiving the handover complete message. In another design of block 1320, the target base station may start a timer after receiving a message confirming completion of handover tasks by the UE, e.g., as shown in FIGS. 8 and 9. The target base station may restart the timer whenever a Layer 2 packet intended for the source base station is received from the UE at the target base station, e.g., as shown in FIG. 8. The target base station may send the IP packets to the serving gateway after expiration of the timer. In yet another design of block 1320, the target base station may forward the IP packets via an IP tunnel to the source base station if a connection from the target base station to the serving gateway is not available, e.g., as shown in FIG. 10. The target base station may send the IP packets to the serving gateway if the connection is available.

FIG. 14 shows a design of an apparatus 1400 for receiving data on the uplink in a wireless communication system. Apparatus 1400 includes a module 1412 to receive Layer 2 packets from a UE performing handover from a source base station to a target base station, a module 1414 to identify Layer 2 packets intended for the source base station among the Layer 2 packets received from the UE, a module 1416 to forward the Layer 2 packets intended for the source base station via a Layer 2 tunnel from the target base station to the source base station, a module 1418 to process Layer 2 packets intended for the target base station to obtain IP packets, and a module 1420 to send the IP packets to a serving gateway in response to a trigger condition.

Figures 15, 16:
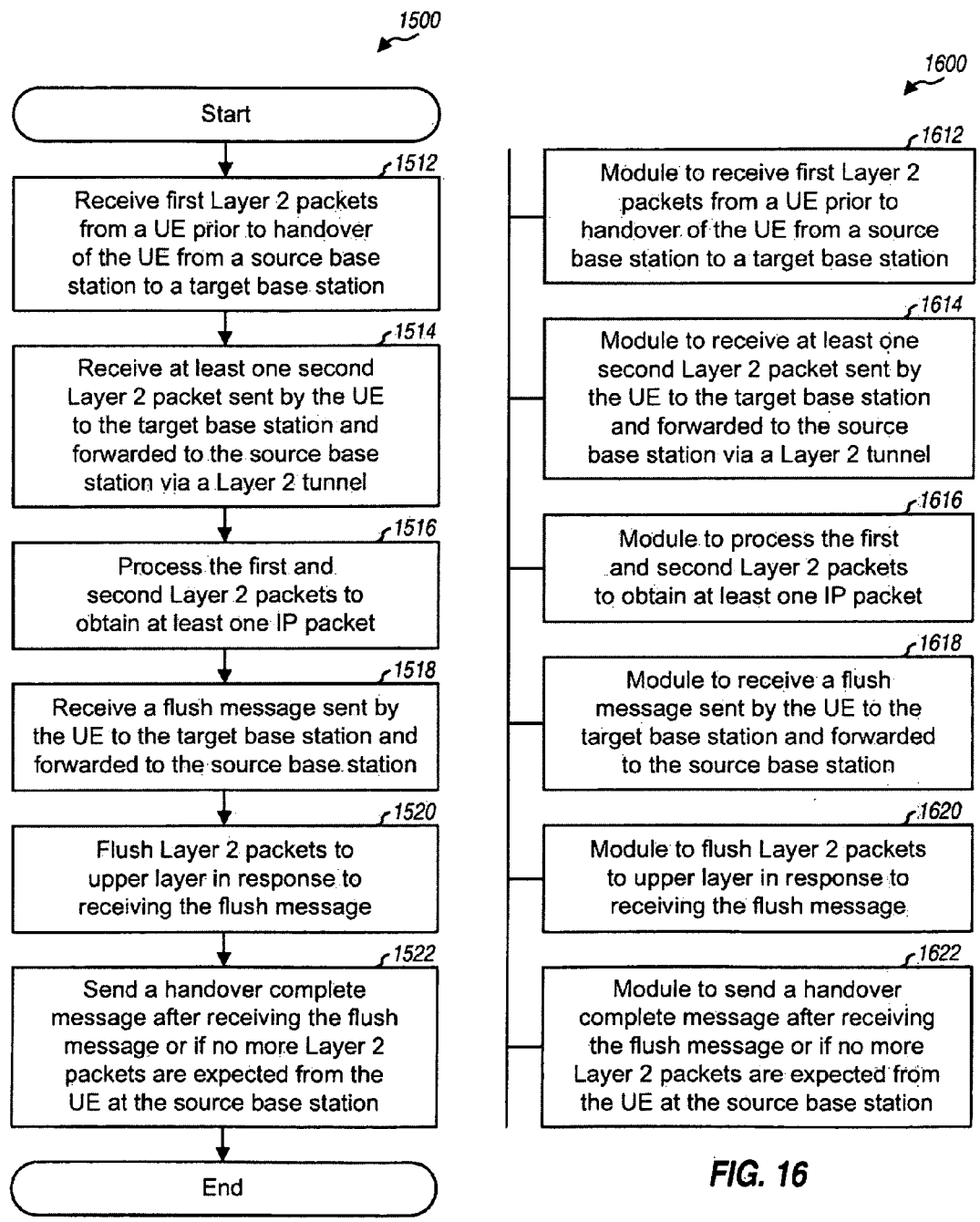
FIGS. 15 and 16 show a process and an apparatus, respectively, for receiving data on the uplink at a source base station.

FIG. 15 shows a design of a process 1500 for receiving data on the uplink in a wireless communication system. Process 1500 may be performed by a source base station/eNB (as described below) or by some other entity. The source base station may receive first Layer 2 packets from a UE prior to handover of the UE from the source base station to a target base station (block 1512). The source base station may receive at least one second Layer 2 packet sent by the UE to the target base station and forwarded to the source base station via a Layer 2 tunnel (block 1514). The source base station may process the first and second Layer 2 packets to obtain at least one IP packet (block 1516).

The source base station may receive a flush message sent by the UE to the target base station and forwarded to the source base station (block 1518). The source base station may flush its Layer 2 packets to upper layer in response to receiving the flush message (block 1520). The source base station may send a handover complete message after receiving the flush message or if no more Layer 2 packets are expected from the UE at the source base station, e.g., if there are no Layer 2 holes or a timeout has occurred for filing the Layer 2 holes (block 1522).

FIG. 16 shows a design of an apparatus 1600 for receiving data on the uplink in a wireless communication system. Apparatus 1600 includes a module 1612 to receive first Layer 2 packets from a UE prior to handover of the UE from a source base station to a target base station, a module 1614 to receive at least one second Layer 2 packet sent by the UE to the target base station and forwarded to the source base station via a Layer 2 tunnel, a module 1616 to process the first and second Layer 2 packets to obtain at least one IP packet, a module 1618 to receive a flush message sent by the UE to the target base station and forwarded to the source base station, a module 1620 to flush Layer 2 packets to upper layer at the source base station in response to receiving the flush message, and a module 1622 to send a handover complete message after receiving the flush message or if no more Layer 2 packets are expected from the UE at the source base station.

FIG. 17 shows a design of a process 1700 for sending data on the downlink in a wireless communication system. Process 1700 may be performed by a target base station/eNB (as described below) or by some other entity. The target base station may receive at least one first Layer 2 packet forwarded by a source base station to the target base station via a Layer 2 tunnel (block 1712). The target base station may send the at least one first Layer 2 packet to a UE performing handover from the source base station to the target base station (block 1714). The target base station may generate second Layer 2 packets for the UE (block 1716). Each first Layer 2 packet may include a source indicator set to a first value for the source base station. The target base station may set a source indicator of each second Layer 2 packet to a second value for the target base station. The target base station may send the second Layer 2 packets to the UE (block 1718).

In one design, the target base station may receive from the source base station a message indicating no more first Layer 2 packets to forward to the target base station. The target base station may send the second Layer 2 packets to the UE after receiving the message. In another design, the target base station may send a handover complete message to the UE and may start a timer in response to sending this message. The target base station may then send the second Layer 2 packets to the UE after expiration of the timer.

In one design, the target base station may receive (i) first IP packets forwarded by the source base station to the target base station via an IP tunnel and (ii) second IP packets from a serving gateway. The target base station may process the first IP packets followed by the second IP packets to generate the second Layer 2 packets.

In one design, the target base station may maintain (i) a first buffer for the first Layer 2 packets received from the source base station and (ii) a second buffer for the second Layer 2 packets generated by the target base station. The target base station may send the first Layer 2 packets in the first buffer to the UE before the second Layer 2 packets in the second buffer.

FIG. 18 shows a design of an apparatus 1800 for sending data on the downlink in a wireless communication system. Apparatus 1800 includes a module 1812 to receive at least one first Layer 2 packet forwarded by a source base station to a target base station via a Layer 2 tunnel, a module 1814 to send the at least one first Layer 2 packet to a UE performing handover from the source base station to the target base station, a module 1816 to generate second Layer 2 packets for the UE at the target base station, and a module 1818 to send the second Layer 2 packets to the UE.

FIG. 19 shows a design of a process 1900 for receiving data on the downlink in a wireless communication system. Process 1900 may be performed by a UE (as described below) or by some other entity. The UE may receive first Layer 2 packets from a source base station prior to handover of the UE from the source base station to a target base station, with the first Layer 2 packets being generated by the source base station (block 1912). The UE may receive at least one second Layer 2 packet from the target base station, with the at least one second Layer 2 packet being generated by the source base station and forwarded to the target base station via a Layer 2 tunnel (block 1914). The UE may determine whether each Layer 2 packet is generated by the source base station or the target base station based on a source indicator of that Layer 2 packet, which may be set to a first value for the source base station or a second value for the target base station. The UE may process the first and second Layer 2 packets to obtain first IP packets sent by the source base station to the UE (block 1916). In one design, the UE may receive a message indicating no more first Layer 2 packets. The message may be originated from the source base station and forwarded by the target base station to the UE. The UE may pass the first and second Layer 2 packets up to a next higher protocol in a protocol stack in response to the message. The UE may receive third Layer 2 packets from the target base station after the handover, with the third Layer 2 packets being generated by the target base station (block 1918). The UE may process the third Layer 2 packets to obtain second IP packets sent by the target base station to the UE (block 1920).

FIG. 20 shows a design of an apparatus 2000 for receiving data on the downlink in a wireless communication system. Apparatus 2000 includes a module 2012 to receive first Layer 2 packets from a source base station prior to handover of a UE from the source base station to a target base station, with the first Layer 2 packets being generated by the source base station, a module 2014 to receive at least one second Layer 2 packet from the target base station, with the at least one second Layer 2 packet being generated by the source base station and forwarded to the target base station via a Layer 2 tunnel, a module 2016 to process the first and second Layer 2 packets to obtain first IP packets sent by the source base station to the UE, a module 2018 to receive third Layer 2 packets from the target base station after the handover, with the third Layer 2 packets being generated by the target base station, and a module 2020 to process the third Layer 2 packets to obtain second IP packets sent by the target base station to the UE.

The modules in FIGS. 12, 14, 16, 18 and 20 may comprise processors, electronics devices, hardware devices, electronics components, logical circuits, memories, etc., or any combination thereof.

Figure 21:
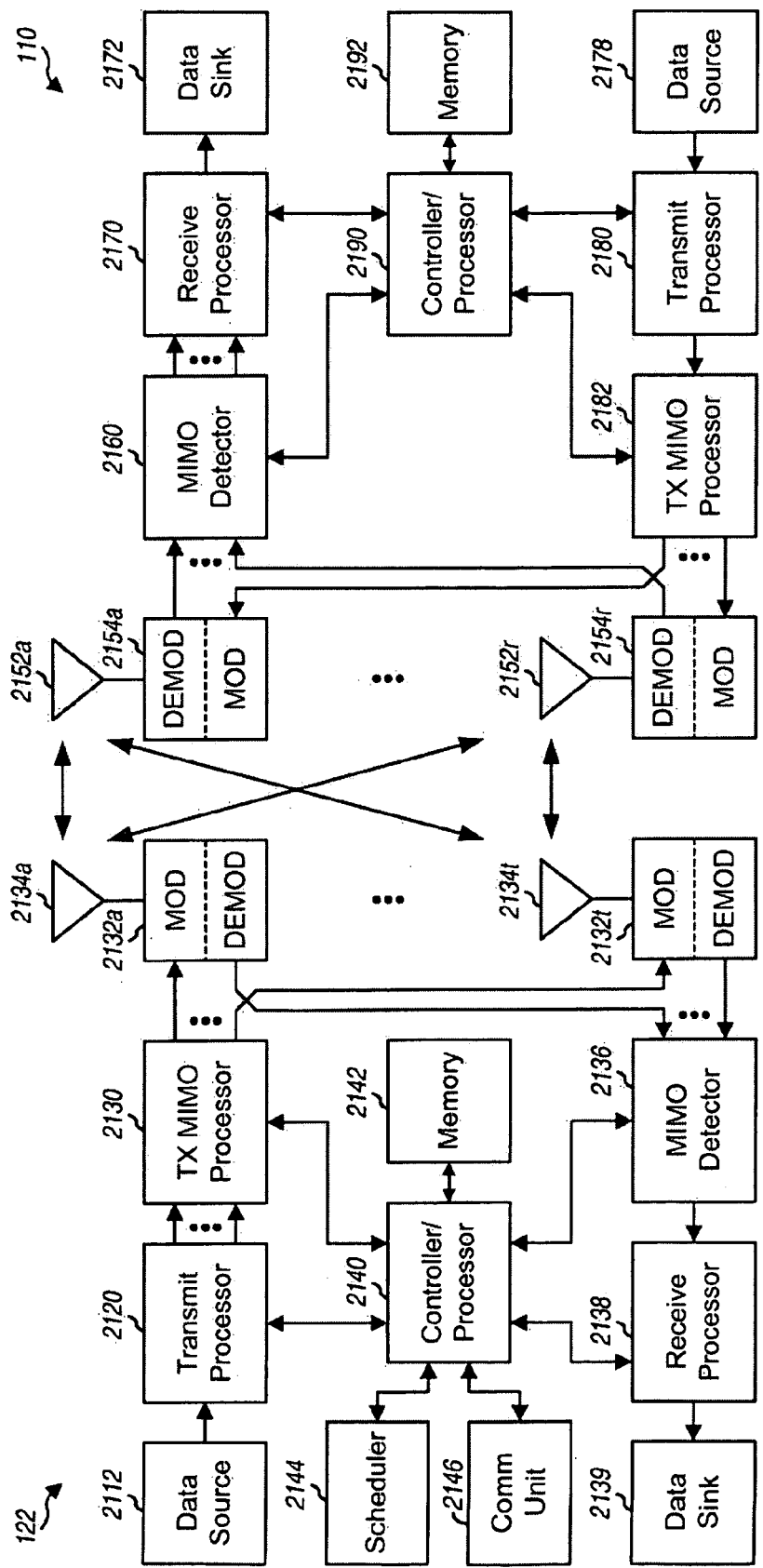
FIG. 21 shows a block diagram of a UE and a base station.

FIG. 21 shows a block diagram of a design of UE 110 and target base station/eNB 122. In this design, eNB 122 is equipped with T antennas 2134a through 2134t, and UE 110 is equipped with R antennas 2152a through 2152r, where in general $T \geq 1$ and $R \geq 1$.

At eNB 122, a transmit processor 2120 may receive data for one or more UEs from a data source 2112, process (e.g., encode and modulate) the data for each UE based on one or more modulation and coding schemes, and provide data symbols for all UEs. Transmit processor 2120 may also receive messages (e.g., the messages shown in FIGS. 6 through 10) from a controller/processor 2140, process the messages, and provide control symbols. A transmit (TX) multiple-input multiple-output (MIMO) processor 2130 may multiplex the data symbols, the control symbols, and pilot symbols, process (e.g., precode) the multiplexed symbols, and provide T output symbol streams to T modulators (MOD) 2132a through 2132t. Each modulator 2132 may process a respective output symbol stream (e.g., for OFDM) to obtain an output sample stream. Each modulator 2132 may further process (e.g., convert to analog, amplify, filter, and upconvert) the output sample stream to obtain a downlink signal. T downlink signals from modulators 2132a through 2132t may be transmitted via T antennas 2134a through 2134t, respectively.

At UE 110, R antennas 2152a through 2152r may receive the downlink signals from eNB 122 and provide received signals to demodulators (DEMOD) 2154a through 2154r, respectively. Each demodulator 2154 may condition (e.g., filter, amplify, downconvert, and digitize) a respective received signal to obtain received samples and may further process the received samples (e.g., for OFDM) to obtain received symbols. A MIMO detector 2160 may perform MIMO detection on the received symbols from all R demodulators 2154a through 2154r and provide detected symbols. A receive processor 2170 may process the detected symbols, provide decoded data for UE 110 to a data sink 2172, and provide decoded messages to a controller/processor 2190.

On the uplink, at UE 110, data from a data source 2178 and messages from controller/processor 2190 may be processed by a transmit processor 2180, precoded by a TX MIMO processor 2182 (if applicable), conditioned by modulators 2154a through 2154r, and transmitted via antennas 2152a through 2152r. At eNB 122, the uplink signals from UE 110 may be received by antennas 2134, conditioned by demodulators 2132, detected by a MIMO detector 2136, and processed by a receive processor 2138 to obtain the data and messages transmitted by UE 110.

Controllers/processors 2140 and 2190 may direct the operation at eNB 122 and UE 110, respectively. Controller/processor 2140 at eNB 122 may implement or direct process 1300 in FIG. 13, process 1700 in FIG. 17, and/or other processes for the techniques described herein. Controller/processor 2140 may also perform the processing for target eNB 122 in FIGS. 6 through 10. Controller/processor 2190 at UE 110 may implement or direct process 1100 in FIG. 11, process 1900 in FIG. 19, and/or other processes for the techniques described herein. Controller/processor 2190 may also perform the processing for UE 110 in FIGS. 6 through 10. Memories 2142 and 2192 may store data and program codes for eNB 122 and UE 110, respectively. A scheduler 2144 may schedule UEs for transmissions on the downlink and/or uplink and may assign resources to the scheduled UEs. A communication (Comm) unit 2146 may support communication with other eNBs and MME/serving gateway 130.

Source eNB 120 in FIG. 1 may be implemented in similar manner as target eNB 122 in FIG. 21. A controller/processor at source eNB 120 may implement or direct process 1500 in FIG. 15 and/or other processes for the techniques described herein. The controller/processor may also perform the processing for the source eNB in FIGS. 6 through 10.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending data in a wireless communication system, comprising:
    sending first Layer 2 packets from a mobile entity to a source base station prior to handover of a user equipment (UE) from the source base station to a target base station, the first Layer 2 packets being indicated for the source base station by a destination indicator consisting of one or more bits of a Radio Link Control (RLC) header in each of the first Layer 2 packets set to a first value assigned to the source base station, wherein the RLC header is in a protocol data unit (PDU) of an RLC sublayer that is distinct from a lower Media Access Control (MAC) sublayer;
    sending at least one second Layer 2 packet from the mobile entity directly to the target base station, the at least one second Layer 2 packet being indicated for the source base station by the destination indicator set to the first value for forwarding from the target base station to the source base station via a Layer 2 tunnel; and
    sending third Layer 2 packets from the mobile entity to the target base station after the handover, the third Layer 2 packets being indicated for the target base station by the destination indicator set to a second value assigned to the target base station.

2. The method of claim 1, further comprising:
setting the destination indicator of each first Layer 2 packet and each second Layer 2 packet to the first value for the source base station; and
setting the destination indicator of each third Layer 2 packet to the second value for the target base station.

3. The method of claim 1, further comprising:
processing first Internet Protocol (IP) packets in accordance with a first Layer 2 configuration for the source base station to obtain the first and second Layer 2 packets; and
processing second IP packets in accordance with a second Layer 2 configuration for the target base station to obtain the third Layer 2 packets, wherein the second Layer 2 configuration is different from the first Layer 2 configuration.

4. The method of claim 3, further comprising:
receiving from the target base station a message indicating a connection between the target base station and a serving gateway is set up;
using the first Layer 2 configuration prior to receiving the message; and
using the first or second Layer 2 configuration after receiving the message.

5. The method of claim 1, further comprising:
receiving from the target base station a message indicating a connection between the target base station and a serving gateway is set up; and
switching to the connection in response to receiving the message.

6. The method of claim 1, further comprising:
sending a flush message to indicate that no more Layer 2 packets are indicated for the source base station, the flush message being received by the target base station and forwarded to the source base station.

7. The method of claim 1, wherein the first, second, and third Layer 2 packets comprise RLC PDUs.

8. An apparatus for wireless communication, comprising:
at least one processor configured to send first Layer 2 packets from a mobile entity to a source base station prior to handover of a user equipment (UE) from the source base station to a target base station, the first Layer 2 packets being indicated for the source base station by a destination indicator consisting of one or more bits of a Radio Link Control (RLC) header in each of the first Layer 2 packets set to a first value assigned to the source base station, wherein the RLC header is in a protocol data unit (PDU) of an RLC sublayer that is distinct from a lower Media Access Control (MAC) sublayer, to send at least one second Layer 2 packet from mobile entity directly to the target base station, the at least one second Layer 2 packet being indicated for the source base station by the destination indicator set to the first value for forwarding from the target base station to the source base station via a Layer 2 tunnel, and to send third Layer 2 packets from the mobile entity to the target base station after the handover, the third Layer 2 packets being indicated for the target base station by the destination indicator set to a second value assigned to the target base station.

9. The apparatus of claim 8, wherein the at least one processor is configured to set the destination indicator of each first Layer 2 packet and each second Layer 2 packet to the first value for the source base station, and to set the destination indicator of each third Layer 2 packet to the second value for the target base station.

10. The apparatus of claim 8, wherein the at least one processor is configured to process first Internet Protocol (IP) packets in accordance with a first Layer 2 configuration for the source base station to obtain the first and second Layer 2 packets, and to process second IP packets in accordance with a second Layer 2 configuration for the target base station to obtain the third Layer 2 packets, wherein the second Layer 2 configuration is different from the first Layer 2 configuration.

11. An apparatus for wireless communication, comprising:
means for sending first Layer 2 packets from a mobile entity to a source base station prior to handover of a user equipment (UE) from the source base station to a target base station, the first Layer 2 packets being indicated for the source base station by a destination indicator consisting of one or more bits of a Radio Link Control (RLC) header in each of the first Layer 2 packets set to a first value assigned to the source base station, wherein the RLC header is in a protocol data unit (PDU) of an RLC sublayer that is distinct from a lower Media Access Control (MAC) sublayer;
means for sending at least one second Layer 2 packet from the mobile entity directly to the target base station, the at least one second Layer 2 packet being indicated for the source base station by the destination indicator set to the first value for forwarding from the target base station to the source base station via a Layer 2 tunnel; and
means for sending third Layer 2 packets to the target base station after the handover, the third Layer 2 packets being indicated for the target base station by the destination indicator set to a second value assigned to the target base station.

12. The apparatus of claim 11, further comprising:
means for setting the destination indicator of each first Layer 2 packet and each second Layer 2 packet to the first value for the source base station; and
means for setting the destination indicator of each third Layer 2 packet to the second value for the target base station.

13. The apparatus of claim 11, further comprising:
means for processing first Internet Protocol (IP) packets in accordance with a first Layer 2 configuration for the source base station to obtain the first and second Layer 2 packets; and
means for processing second IP packets in accordance with a second Layer 2 configuration for the target base station to obtain the third Layer 2 packets, wherein the second Layer 2 configuration is different from the first Layer 2 configuration.

14. A computer program product, comprising:
a non-transitory computer-readable medium comprising:
code for causing at least one computer to send first Layer 2 packets to a source base station prior to handover of a user equipment (UE) from the source base station to a target base station, the first Layer 2 packets being indicated for the source base station by a destination indicator consisting of one or more bits of a Radio Link Control (RLC) header in each of the first Layer 2 packets set to a first value assigned to the source base station, wherein the RLC header is in a protocol data unit (PDU) of an RLC sublayer that is distinct from a lower Media Access Control (MAC) sublayer,
code for causing the at least one computer to send at least one second Layer 2 packet to the target base station, the at least one second Layer 2 packet being indicated for the source base station by the destination indicator set to the first value for forwarding from the target base station to the source base station via a Layer 2 tunnel, and code for causing the at least one computer to send third Layer 2 packets to the target base station after the handover, the third Layer 2 packets being indicated for the target base station by the destination indicator set to a second value assigned to the target base station.

* * * * *